(12) United States Patent
Imori et al.

(10) Patent No.: US 6,498,413 B2
(45) Date of Patent: Dec. 24, 2002

(54) ALTERNATOR, STATOR WINDING ASSEMBLY THEREFOR, AND METHOD OF MANUFACTURE FOR THE STATOR WINDING ASSEMBLY

(75) Inventors: Hideo Imori, Tokyo (JP); Yoshihito Asao, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 13 days.

(21) Appl. No.: 09/734,680

(22) Filed: Dec. 13, 2000

(65) Prior Publication Data
US 2001/0020807 A1 Sep. 13, 2001

(30) Foreign Application Priority Data
Mar. 13, 2000 (JP) ......................................... 2000-068762

(51) Int. Cl.⁷ .............................. H02K 3/48; H02K 3/12
(52) U.S. Cl. ....................... 310/180; 310/184; 310/208
(58) Field of Search ............................... 310/254, 179, 310/180, 208, 184, 263, 201

(56) References Cited

U.S. PATENT DOCUMENTS

| | | | |
|---|---|---|---|
| 2,821,641 A | | 1/1958 | Ringland |
| 5,708,316 A | * | 1/1998 | Ishida ........................ 310/184 |
| 5,986,375 A | * | 11/1999 | Umeda et al. .............. 310/180 |
| 6,181,045 B1 | * | 1/2001 | Umeda et al. .............. 310/201 |
| 6,211,594 B1 | * | 4/2001 | Umeda et al. .............. 310/180 |

FOREIGN PATENT DOCUMENTS

| | | |
|---|---|---|
| DE | 199 22 794 A1 * | 11/1999 |
| JP | 9-103052 | 4/1977 |
| JP | 29-27288 | 5/1999 |
| JP | 11-164506 | 6/1999 |

* cited by examiner

Primary Examiner—Tran Nguyen
(74) Attorney, Agent, or Firm—Sughrue Mion, PLLC

(57) ABSTRACT

A stator winding includes a plurality of winding sub-portions in each of which a strand of wire formed from a continuous wire is wound so as to alternately occupy an inner layer and an outer layer in a slot depth direction within slots at intervals of a predetermined number of slots and form a lap winding having two turns in each lap, the strands of wire folding over outside the slots at end surfaces of a stator core, four of the strands of wire constituting the winding sub-portions begin housed so as to line up in each of the slots in a slot depth direction, turn portions formed by folding the strands of wire over outside the slots at a first end surface of the stator core being disposed circumferentially to form two rows in a radial direction, and turn portions formed by folding the strands of wire over outside the slots at a second end surface of the stator core being disposed circumferentially to form two layers in an axial direction.

9 Claims, 23 Drawing Sheets

ALTERNATOR, STATOR WINDING ASSEMBLY THEREFOR, AND METHOD OF MANUFACTURE FOR THE STATOR WINDING ASSEMBLY

BACKGROUND OF THE INVENTION

1. Field of the Invention

The present invention relates to an automotive alternator mounted to an automotive vehicle such as a passenger car or a truck, for example, to a stator winding assembly of the automotive alternator, and to a method of manufacture for the stator winding assembly.

2. Description of the Related Art

To reduce the size and increase the output of alternators driven by internal combustion engines, it is necessary to increase the space factor of electrical conductors housed within magnetic circuits of a stator, and to line up and increase the density of crossover portions (coil end portions) of a stator winding, and various improvements have been proposed, as for example in Japanese Patent Laid-Open No. HEI 11-164506.

FIGS. 27 and 28 are perspectives from a front end and a rear end, respectively, of part of a stator winding of a conventional alternator of this type, and FIG. 29 is a perspective showing a construction of a conductor segment used in the stator winding of the conventional alternator shown in FIGS. 27 and 28.

In FIGS. 27 to 29, a stator 90 is constituted by a stator core 91, a stator winding 92 constituted by a number of electrical conductors disposed inside slots 91a formed in the stator core 91, and insulators 93 providing electrical insulation between the stator core 91 and the electrical conductors.

In the stator core 91 of this conventional example, ninety-six slots 91a are disposed at even pitch so as to house two three-phase alternating current windings such that the number of slots housing each phase portion of the three-phase alternating current windings corresponds to the number of magnetic poles in a rotor. Four electrical conductors are housed within each of the slots 91a so as to line up in one row in a radial direction, and these electrical conductors are connected in a predetermined winding pattern to form the stator winding 92. Here, a first position, a second position, a third position, and a fourth position in a radial direction from an inner circumferential side inside the slots 91a in which the electrical conductors are housed will be called a first address, a second address, a third address, and a fourth address, respectively.

Large segments 95 and small segments 96 are formed by bending short lengths of a conductor such as copper into general U shapes in which pairs of straight portions 95a and 96a are linked by turn portions 95b and 96b. The small segments 96 are inserted one at a time from a rear end into pairs of slots 91a six slots apart (a pitch of one magnetic pole). Similarly, the large segments 95 are inserted one at a time from the rear end into pairs of slots 91a six slots apart (a pitch of one magnetic pole). Then, end portions of the large segments 95 and the small segments 96 extending outwards at a front end are joined to each other to constitute the stator winding 92.

More specifically, in pairs of slots 91a six slots apart, the small segments 96 are inserted from the rear end into the second address within first slots 91a and into the third address within second slots 91a, and the large segments 95 are inserted from the rear end into the first address within the first slots 91a and into the fourth address within the second slots 91a. Thus, within each of the slots 91a, two straight portions 95a of the large segments 95 and two straight portions 96a of the small segments 96 are disposed to line up in a row of four in a radial direction.

Then, end portions 95c of the large segments 95 extending outwards at the front end from the first address within the first slots 91a are joined to end portions 96c of the small segments 96 extending outwards at the front end from the second address within the second slots 91a six slots away in a clockwise direction from the first slots 91a. In addition, the end portions 95c of the large segments 95 extending outwards at the front end from the fourth address within the first slots 91a are joined to the end portions 96c of the small segments 96 extending outwards at the front end from the third address within the second slots 91a six slots away in a counter-clockwise direction from the first slots 91a. Thus, two winding sub-portions are formed, which are lap windings having two turns per lap. These two winding sub-portions are connected in series to form one winding phase portion having four turns.

Similarly, a total of six winding phase portions each having four turns are formed by offsetting by one slot at a time the positions of the slots into which the large segments 95 and the small segments 96 are inserted. Then, three each of these winding phase portions are connected into each of the two three-phase alternating current windings which constitute the stator winding 92.

In the conventional stator 90 constructed in this manner, at the rear end of the stator core 91, the turn portions 95b of the large segments 95 are disposed so as to cover outer circumferential sides of the turn portions 96b of the small segments 96 inserted into the same pairs of slots 91a. As a result, the turn portions 95b and 96b are disposed circumferentially to constitute a rear-end coil end group.

At the front end of the stator core 91, on the other hand, joint portions formed by joining the end portions 95c of the large segments 95 extending outwards at the front end from the first address within the first slots 91a and the end portions 96c of the small segments 96 extending outwards at the front end from the second address within the second slots 91a six slots away, and joint portions formed by joining the end portions 95c of the large segments 95 extending outwards at the front end from the fourth address within the first slots 91a and the end portions 96b of the small segments 96 extending outwards at the front end from the third address within the second slots 91a six slots away are disposed to line up radially. As a result, joint portions formed by joining the end portions 95c and 96c to each other are disposed circumferentially in two rows in a radial direction to constitute a front-end coil end group.

Because the stator winding 92 of the conventional alternator is constructed by inserting the large segments 95 and the small segments 96 formed by bending the short lengths of conductor into general U shapes into the slots 91a of the stator core 91 from the rear end and joining together the end portions of the segments extending outwards at the front end as explained above, one problem has been that a large number of the large segments 95 and the small segments 96 must be inserted into the slots 91a of the stator core 91 and end portions thereof must be joined one by one, significantly reducing workability and decreasing mass-producibility.

In addition, in order to join the end portions 95c of the large segments 95 and the end portions 96c of the small segments 96, it is necessary to clamp a portion of each of the end portions 95c and 96c together using a jig, and another problem has been that it is necessary to extend the segments out by an extra amount from the stator coil 91 to allow for the clamping, preventing the stator 90 from being reduced in size.

In the conventional stator 90, because the end portions 95c and 96c are joined to each other by clamping portions thereof in a jig and welding the end portions 95c and 96c together, the height of the coil ends is increased, and the large segments 95 and the small segments 96 are softened by temperature increases during welding, thereby causing rigidity of the stator to be decreased. As a result, other problems have been that when the conventional stator 90 is mounted to an alternator, coil leakage reactance in the coil end portions is increased to cause output to deteriorate, wind resistance is increased to exacerbate wind noise, and rigidity of the stator is reduced to exacerbate magnetic noise.

SUMMARY OF THE INVENTION

The present invention aims to solve the above problems and an object of the present invention is to provide a winding assembly for an alternator and a method of manufacture therefor enabling mass-producibility to be improved and size to be reduced.

Another objective is to provide an alternator enabling coil end height to be lowered, enabling the number of weld portions on the coil ends to be decreased, and enabling deterioration in output, wind noise and magnetic noise to be suppressed.

In order to achieve the above object, according to one aspect of the present invention, there is provided an alternator including:

a stator having a cylindrical stator core formed with a plurality of slots extending axially at a predetermined pitch in a circumferential direction, and a stator winding installed into the stator core; and a rotor for forming north-seeking (N) and south-seeking (S) poles about a rotational circumference, the rotor being disposed on an inner circumferential side of the stator core, wherein the stator winding comprises a plurality of winding sub-portions in each of which a strand of wire formed from a continuous wire is wound so as to alternately occupy an inner layer and an outer layer in a slot depth direction within the slots at intervals of a predetermined number of slots by folding over the strand of wire outside the slots at end surfaces of the stator core and form a lap winding having two turns in each lap.

Four of the strands of wire constituting the winding sub-portions may be housed so as to line up in each of the slots so as to occupy a first layer, a second layer, a third layer, and a fourth layer in a slot depth direction;

turn portions formed by folding the strands of wire over outside the slots at a first end surface of the stator core may be disposed circumferentially to form two rows in a radial direction; and turn portions formed by folding the strands of wire over outside the slots at a second end surface of the stator core may be disposed circumferentially to form two layers in an axial direction.

In each of slot pairs in which first and second slots forming each of the slot pairs are a predetermined number of slots apart:

the strand of wire housed in the first layer inside the first slot may be folded over outside the slots at the first end surface of the stator core and housed in the second layer inside the second slot;

the strand of wire housed in the third layer of the first slot may be folded over outside the slots at the first end surface of the stator core and housed in the fourth layer of the second slot;

the strand of wire housed in the third layer inside the first slot may be folded over outside the slots at the second end surface of the stator core and housed in the second layer inside the second slot; and the strand of wire housed in the fourth layer of the first slot may be folded over outside the slots at the second end surface of the stator core and housed in the first layer of the second slot.

The strands of wire may be installed two at a time into slot sets constituted by slot groups disposed a predetermined number of slots apart, the two strands of wire installed in each of the slot sets constituting a first strand of wire and a second strand of wire, and the stator winding may be composed of a plurality of stator winding phase portions, each of the stator winding phase portions comprising:

a first winding sub-portion constructed by joining first and second end portions of the first strand of wire extending outwards outside the slots at the second end surface of the stator core from the fourth layer in the first slot of a first pair and the first layer in the second slot of the first pair, the first pair being one pair of the slot pairs constituting each of the slot sets; and a second winding sub-portion constructed by joining first and second end portions of the second strand of wire extending outwards outside the slots at the second end surface of the stator core from the third layer in the first slot of the first pair and the second layer in the second slot of the first pair, wherein each of the stator winding phase portions is constructed by connecting the first and second winding sub-portions in series by crossover connecting the first strand of wire extending outwards outside the slots at the second end surface of the stator core from the fourth layer in the first slot of a second pair, and the second strand of wire extending outwards from the outside of the slots at the second end surface of the stator core from the second layer in the second slot of the second pair, the second pair being another pair of the slot pairs constituting each of the slot sets, and wherein the second strand of wire extending outwards at the second end surface of the stator core from the third layer in the first slot of the second pair, and the first strand of wire extending outwards at the second end surface of the stator core from the first layer in the second slot of the second pair constitute a neutral point, and an output wire of the stator winding phase portion, respectively.

The strands of wire may be installed two at a time into slot sets constituted by slot groups disposed a predetermined number of slots apart, the two strands of wire installed in each of the slot sets constituting a first strand of wire and a second strand of wire, and the stator winding may be composed of a plurality of stator winding phase portions, each of the stator winding phase portions being constructed by a first and second winding sub-portions which are connected in series by joining a first end portion of the first strand of wire extending outwards outside the slots at the second end surface of the stator core from the fourth layer in the first slot of a first pair to a second end portion of the second strand of wire extending outwards outside the slots at the second end surface of the stator core from the second layer in the second slot of the first pair, and joining a first end portion of the second strand of wire extending outwards outside the slots at the second end surface of the stator core from the third layer in the first slot of the first pair to a second end portion of the first strand of wire extending outwards outside the slots at the second end surface of the stator core from the first layer in the second slot of the second pair, the first pair being one pair of the slots pair constituting each of the slot sets, wherein the second strand of wire extending outwards at the first end surface of the stator core from the third layer in the first slot of a second pair and from the fourth layer in the second slot of the second pair is cut to constitute a neutral point and an output wire of the stator winding phase portion, the second pair being another pair of the slot pairs constituting each of the slot sets.

In each of slot pairs in which first and second slots forming each of the slot pairs are a predetermined number of slots apart:

the strand of wire housed in the second layer inside the first slot may be folded over outside the slots at the first end surface of the stator core and housed in the first layer inside the second slot;

the strand of wire housed in the third layer of the first slot may be folded over outside the slots at the first end surface of the stator core and housed in the fourth layer of the second slot;

the strand of wire housed in the second layer inside the first slot may be folded over outside the slots at the second end surface of the stator core and housed in the third layer inside the second slot; and the strand of wire housed in the fourth layer of the first slot may be folded over outside the slots at the second end surface of the stator core and housed in the first layer of the second slot.

The strands of wire may be installed two at a time into slot sets constituted by slot groups disposed a predetermined number of slots apart, the two strands of wire installed in each of the slot sets constituting a first strand of wire and a second strand of wire, and the stator winding may be composed of a plurality of stator winding phase portions, each of the stator winding phase portions comprising:

a first winding sub-portion constructed by joining first and second end portions of the first strand of wire extending outwards outside the slots at the second end surface of the stator core from the fourth layer in the first slot of a first pair and the first layer in the second slot of the first pair, the first pair being one pair of the slot pairs constituting each of the slot sets; and a second winding sub-portion constructed by joining first and second end portions of the second strand of wire extending outwards outside the slots at the second end surface of the stator core from the second layer in the first slot of the first pair and the third layer in the second slot of the first pair, wherein each of the stator winding phase portions is constructed by connecting the first and second sub-portions in series by crossover connecting the second strand of wire extending outwards outside the slots at the first end surface of the stator core from the third layer in the first slot of a second pair, and the first strand of wire extending outwards from the outside of the slots at the first end surface of the stator core from the first layer in the second slot of the second pair, the second pair being another pair of the slot pairs constituting each of the slot sets, and wherein the first strand of wire extending outwards at the first end surface of the stator core from the second layer in the first slot of the second pair, and the second strand of wire extending outwards at the first end surface of the stator core from the fourth layer in the second slot of the second pair constitute a neutral point and an output wire of the stator winding phase portion, respectively.

Four of the strands of wire constituting the winding sub-portions may be housed so as to line up in each of the slots so as to occupy a first layer, a second layer, a third layer, and a fourth layer in a slot depth direction;

turn portions formed by folding the strands of wire over outside the slots at a first end surface of the stator core may be disposed circumferentially to form two rows in a radial direction; and turn portions formed by folding the strands of wire over outside the slots at a second end surface of the stator core may be disposed in one row circumferentially.

According to another aspect of the present invention, there is a winding assembly for an alternator, the winding assembly including a winding group composed of 2n winding sub-portions disposed at a pitch of p, each of the winding sub-portions being constructed by folding and bending one strand of wire formed from a continuous wire into a pattern, the pattern having:

first straight portions disposed at a pitch of 2np;

second straight portions disposed at the pitch of 2np being offset by an amount w to a first side in a width direction from the first straight portions and offset by an amount np forwards relative to a direction of disposal of the first straight portions;

third straight portions disposed at the pitch of 2np being offset by the amount w to the first side in the width direction from the second portions and offset by the amount np backwards relative to the direction of disposal of the second straight portions;

fourth straight portions disposed at the pitch of 2np being offset by the amount w to the first side in the width direction from the third straight portions and offset by the amount np forwards relative to the direction of disposal of the third straight portions;

first turn portions linking first ends of the first straight portions to first ends of the second straight portions offset by the amount np forwards relative to the direction of disposal of the first straight portions;

second turn portions linking second ends of the second straight portions to second ends of the third straight portions offset by the amount np backwards relative to the direction of disposal of the second straight portions;

third turn portions linking first ends of the third straight portions to first ends of the fourth straight portions offset by the amount np forwards relative to the direction of disposal of the third straight portions; and fourth turn portions linking second ends of the fourth straight portions to second ends of the first straight portions offset by the amount np forwards relative to the direction of disposal of the fourth straight portions, wherein the winding sub-portions are disposed parallel to each other at the pitch of p in the direction of disposal such that the first to fourth straight portions form four layers in the width direction, the first turn portions are disposed parallel to each other at the pitch of p and the third turn portions are disposed parallel to each other at the pitch of p such that the first turn portions and the third turn portions form two rows in the direction of disposal, and the second turn portions are disposed parallel to each other at the pitch of p and the fourth turn portions are disposed parallel to each other at the pitch of p such that the second turn portions and the fourth turn portions form two layers in a longitudinal direction of the straight portions.

According to another aspect of the present invention, there is a winding assembly for an alternator, the winding assembly comprising a winding group composed of 2n winding sub-portions disposed at a pitch of p, each of the winding sub-portions being constructed by folding and bending one strand of wire formed from a continuous wire into a pattern, the pattern having:

first straight portions disposed at a pitch of 2np;

second straight portions disposed at the pitch of 2np being offset by an amount w to a first side in a width direction from the first straight portions and offset by an amount np forwards relative to a direction of disposal of the first straight portions;

third straight portions disposed at the pitch of 2np being offset by the amount w to the first side in the width direction from the second portions and offset by the amount np forwards relative to the direction of disposal of the second straight portions;

fourth straight portions disposed at the pitch of 2np being offset by the amount w to the first side in the width direction from the third straight portions and offset by the amount np backwards relative to the direction of disposal of the third straight portions;

first turn portions linking first ends of the first straight portions to first ends of the second straight portions offset by the amount np forwards relative to the direction of disposal of the first straight portions;

second turn portions linking second ends of the second straight portions to second ends of the third straight portions offset by the amount np forwards relative to the direction of disposal of the second straight portions;

third turn portions linking first ends of the third straight portions to first ends of the fourth straight portions offset by the amount np backwards relative to the direction of disposal of the third straight portions; and fourth turn portions linking second ends of the fourth straight portions to second ends of the first straight portions offset by the amount np forwards relative to the direction of disposal of the fourth straight portions, wherein the winding sub-portions are disposed parallel to each other at the pitch of p in the direction of disposal such that the first to fourth straight portions form four layers in the width direction, the first turn portions are disposed parallel to each other at the pitch of p and the third turn portions are disposed parallel to each other at the pitch of p such that the first turn portions and the third turn portions form two rows in the direction of disposal, and the second turn portions are disposed parallel to each other at the pitch of p and the fourth turn portions are disposed parallel to each other at the pitch of p such that the second turn portions and the fourth turn portions form two layers in a longitudinal direction of the straight portions.

According to another aspect of the present invention, there is a method of manufacture for a winding assembly for an alternator, the method including steps of:

disposing a group of 2n straight strands of wire at a pitch p in a first plane;

forming a lightning-bolt shaped pattern composed of a plurality of basic patterns by folding and bending the group of strands of wire in the plane, each of the basic patterns comprising:

first straight portions having a length $l_0$;

second straight portions having the length $l_0$ being linked to the first straight portions by first inclined portions having a length $1_0$, the second straight portions being offset by an amount np to a first side in a direction of disposal of the strands of wire relative to the first straight portions;

third straight portions having the length $l_0$ being linked to the second straight portions by second inclined portions having the length $l_1$, the third straight portions being offset by the amount np to a second side in a direction of disposal of the strands of wire relative to the second straight portions; and fourth straight portions having the length $l_0$ being linked to the third straight portions by third inclined portions having the length $1_1$, the fourth straight portions being offset by the amount np to the first side in a direction of disposal of the strands of wire relative to the third straight portions, wherein the lightning-bolt shaped pattern is constructed by repeating the basic pattern a predetermined number of times by offsetting the basic pattern to the first side in the direction of disposal of the strands of wire by fourth inclined portions having a length $l_2$, the length $l_2$ being greater than the length $l_1$;

forming a flattened cylindrical body by folding over the group of strands of wire formed into the lightning-bolt shaped pattern in a first direction at central portions of the first and the third inclined portions, the cylindrical body being constructed by helically winding the group of strands of wire such that the second and third straight portions linked by the second inclined portions and the first and fourth straight portions linked by the fourth inclined portions alternately occupy the first plane and a second plane; and forming a winding group by folding over the cylindrical body at central portions of the second and the fourth inclined portions in a second direction such that the second and the third straight portions face each other, wherein the first to fourth straight portions are disposed parallel to each other at the pitch of p in the direction of disposal such that the first to fourth straight portions form four layers in the width direction, first turn portions formed by folding over the group of strands of wire at the first inclined portions are disposed parallel to each other at the pitch of p and third turn portions formed by folding over the group of strands of wire at the third inclined portions are disposed parallel to each other at the pitch of p such that the first turn portions and the third turn portions form two rows in the direction of disposal, and second turn portions of the strands of wire formed by folding over the cylindrical body at the second inclined portions are disposed parallel to each other at the pitch of p and the fourth turn portions of the strands of wire formed by folding over the cylindrical body at the fourth inclined portions are disposed parallel to each other at the pitch of p such that the second turn portions and the fourth turn portions form two layers in a longitudinal direction of the straight portions.

According to another aspect of the present invention, there is a method of manufacture for a winding assembly for an alternator, the method including steps of:

disposing a group of 2n straight strands of wire at a pitch p in a first plane;

forming a lightning-bolt shaped pattern composed of a plurality of basic patterns by folding and bending the group of strands of wire in the plane, each of the basic patterns comprising:

first straight portions having a length $l_0$;

second straight portions having the length $l_0$ being linked to the first straight portions by first inclined portions having a length $l_1$, the second straight portions being offset by an amount np to a first side in a direction of disposal of the strands of wire relative to the first straight portions;

third straight portions having the length $l_0$ being linked to the second straight portions by second inclined portions having the length $l_1$, the third straight portions being offset by the amount np to the first side in a direction of disposal of the strands of wire relative to the second straight portions; and fourth straight portions having the length $l_0$ being linked to the third straight portions by third inclined portions having the length $l_1$, the fourth straight portions being offset by the amount np to a second side in a direction of disposal of the strands of wire relative to the third straight portions, wherein the lightning-bolt shaped pattern is constructed by repeating the basic pattern a predetermined number of times by offsetting the basic pattern to the first side in the direction of disposal of the strands of wire by fourth inclined portions having a length $l_2$, the length $l_2$ being greater than the length $l_1$;

forming a flattened cylindrical body by folding over the group of strands of wire formed into the lightning-bolt shaped pattern in a first direction at central portions of the first and the third inclined portions, the cylindrical body being constructed by helically winding the group of strands of wire such that the second and third straight portions linked by the second inclined portions and the first and fourth straight portions linked by the fourth inclined portions alternately occupy the first plane and a second plane; and forming a winding group by folding over the cylindrical body at central portions of the second and the fourth inclined portions in a second direction such that the second and the third straight portions face each other, wherein the first to fourth straight portions are disposed parallel to each other at the pitch of p in the direction of disposal such that the first to fourth straight portions form four layers in the width direction, first turn portions formed by folding over the group of strands of wire at the first inclined portions are disposed parallel to each other at the pitch of p and third turn portions formed by folding over the group of strands of wire at the third inclined portions are disposed parallel to each other at the pitch of p such that the first turn portions and the third turn portions form two rows in the direction of disposal, and second turn portions of the strands of wire formed by folding over the cylindrical body at the second inclined portions are disposed parallel to each other at the pitch of p and the fourth turn portions of the strands of wire formed by folding over the cylindrical body at the fourth inclined portions are disposed parallel to each other at the pitch of p such that the second turn portions and the fourth turn portions form two layers in a longitudinal direction of the straight portions.

DETAILED DESCRIPTION OF THE PREFERRED EMBODIMENTS

The preferred embodiments of the present invention will now be explained with reference to the drawings.

Embodiment 1

Figure 1:
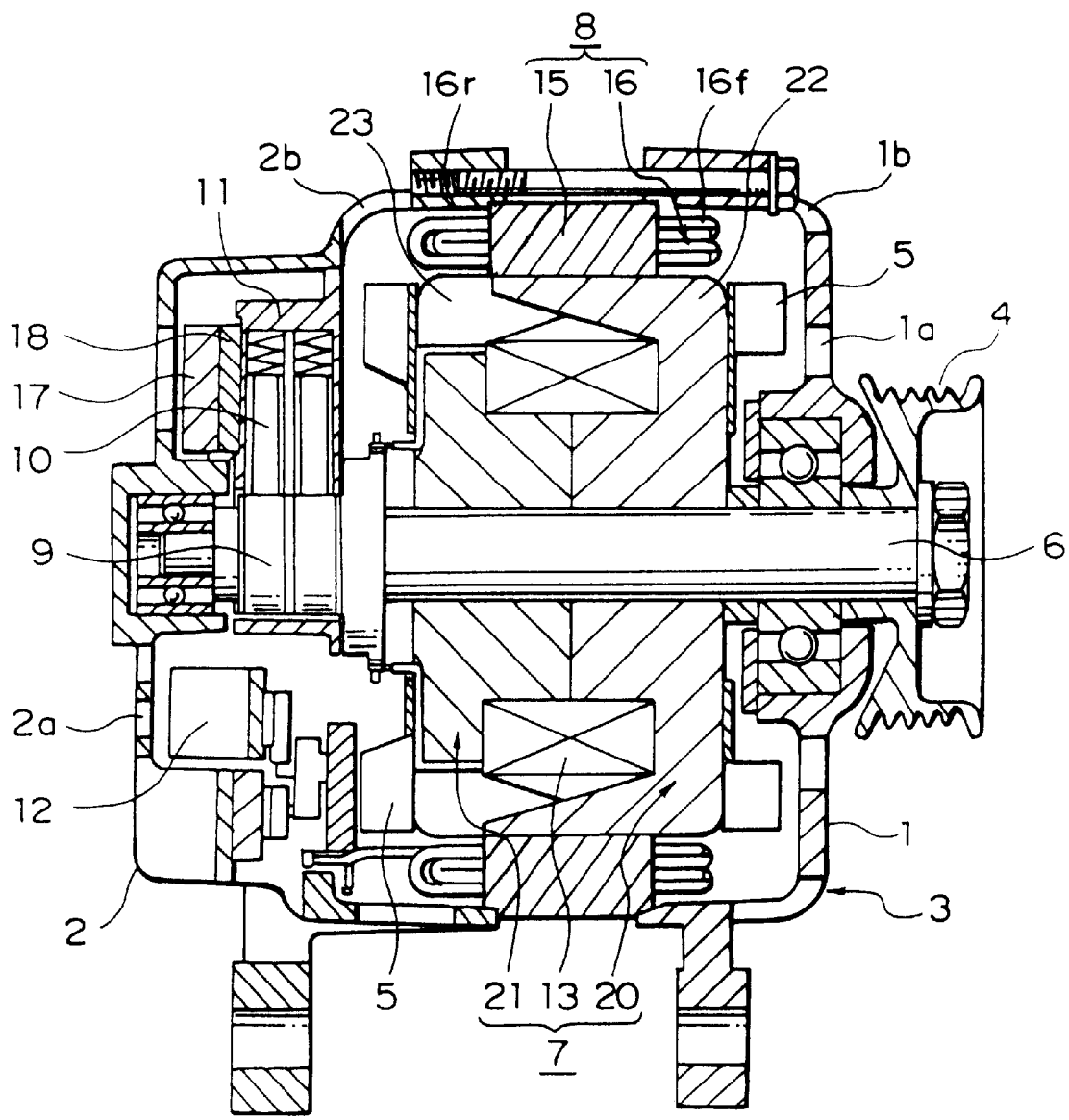
FIG. 1 is a cross section showing a construction of an alternator according to Embodiment 1 of the present invention.
Figure 2:
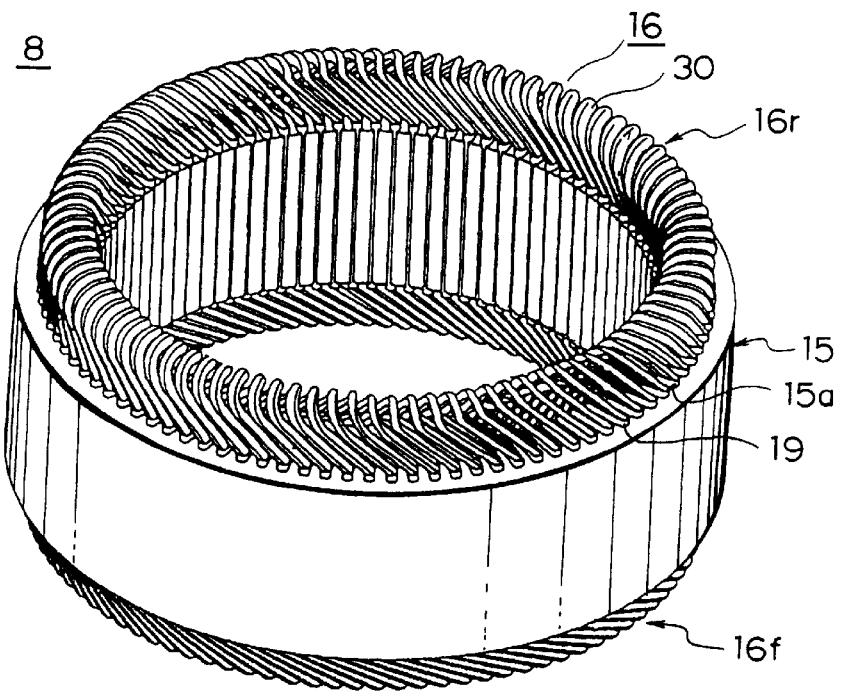
FIG. 2 is a perspective showing a stator of this alternator viewed from a rear end.
Figure 3:
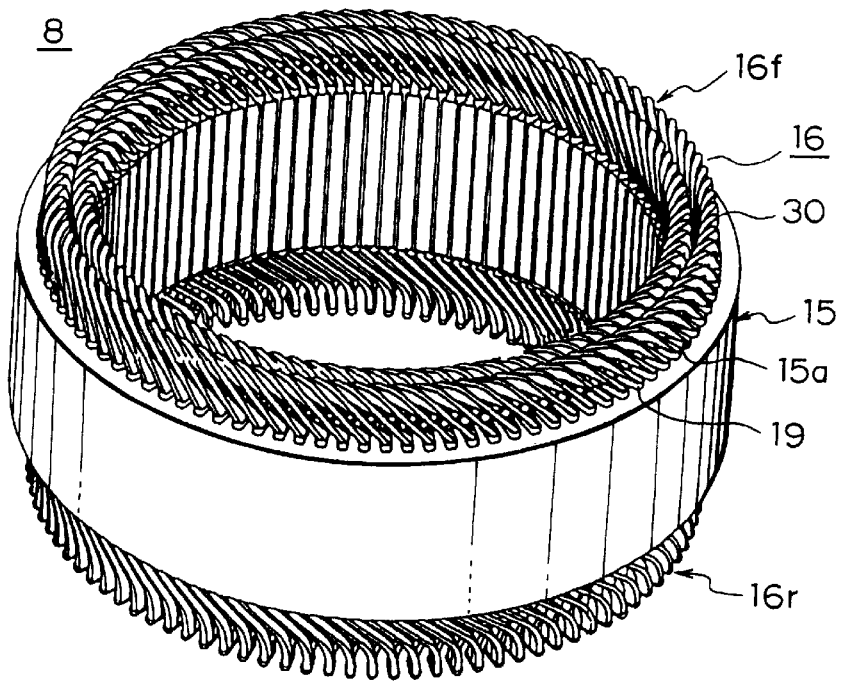
FIG. 3 is a perspective showing the stator of this alternator viewed from a front end.
Figure 4:
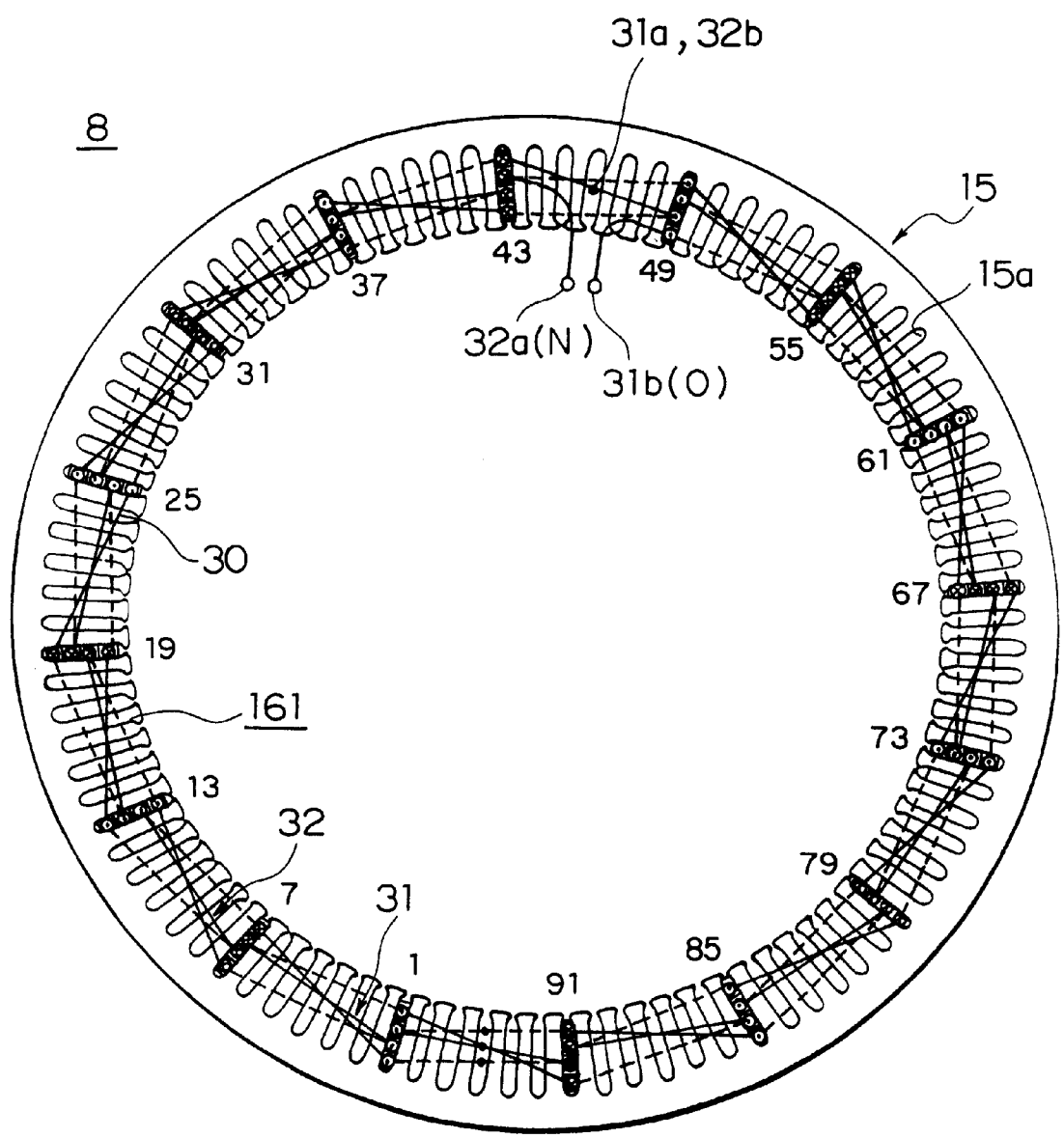
FIG. 4 is a rear end elevation explaining connections in one stator winding phase portion in this alternator.
Figure 5:
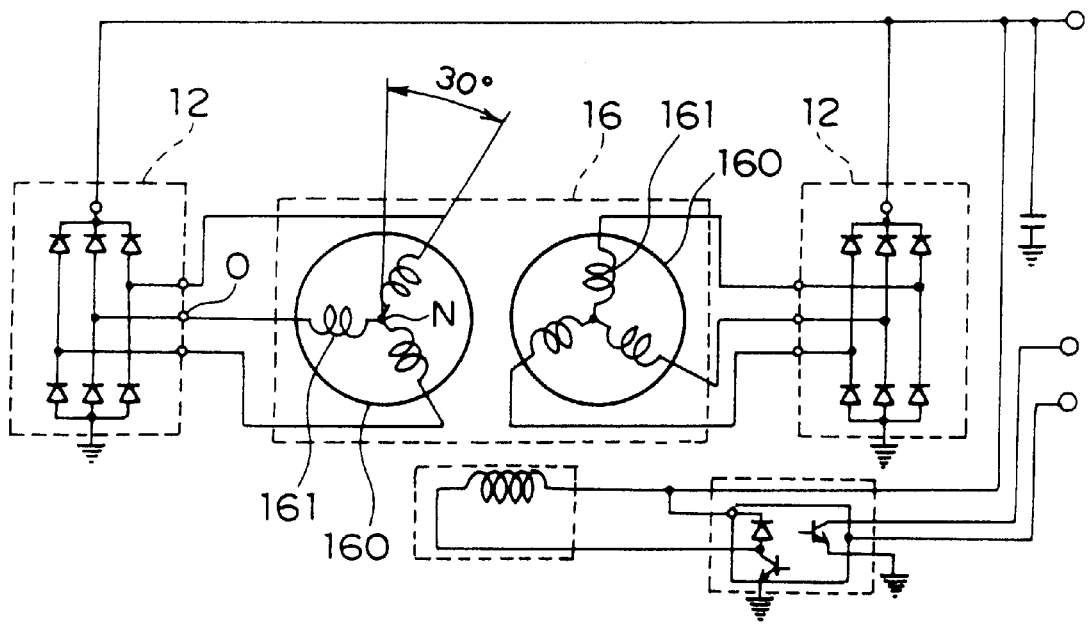
FIG. 5 is a circuit diagram for this alternator.
Figure 11:
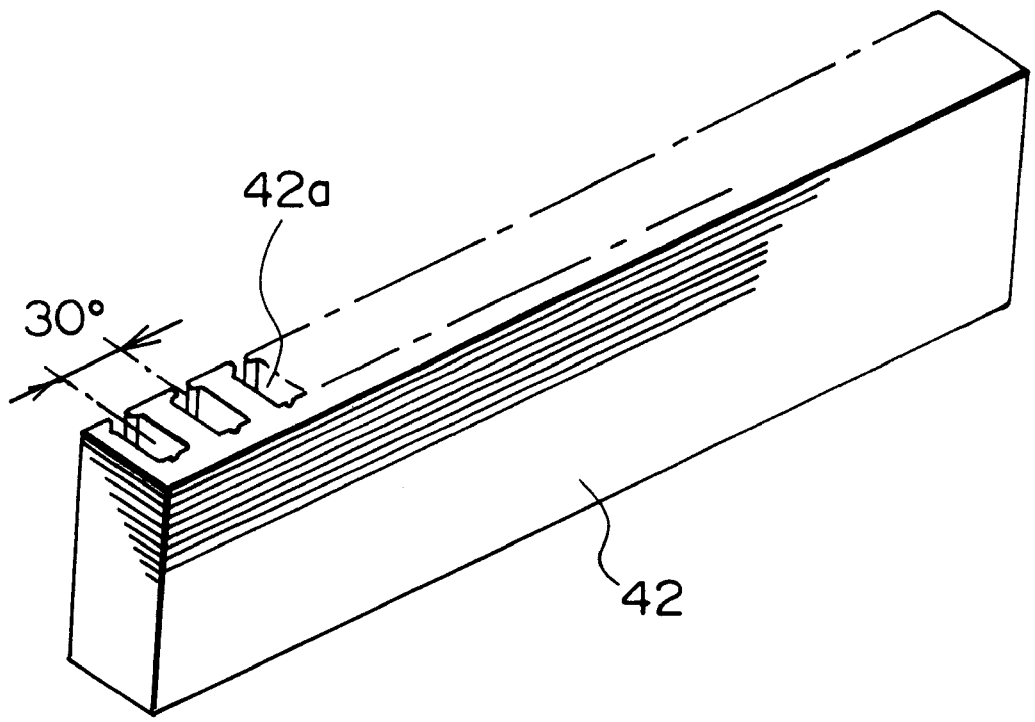
FIG. 11 is a perspective showing the stator of the alternator according to Embodiment 1 of the present invention.
Figure 12A:
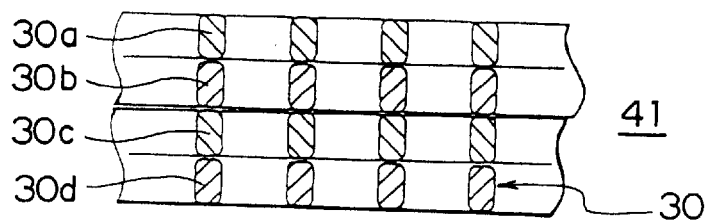
FIG. 12A is a diagram explaining the method of manufacture for the stator of the alternator according to Embodiment 1 of the present invention.
Figure 12B:
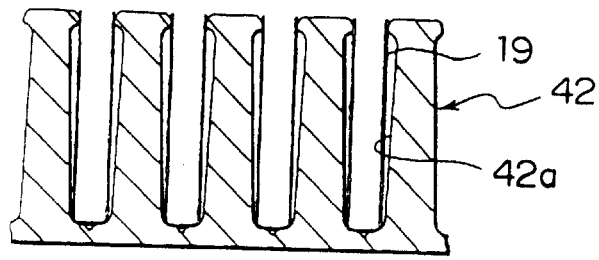
FIG. 12B is a diagram explaining the method of manufacture for the stator of the alternator according to Embodiment 1 of the present invention.
Figure 12C:
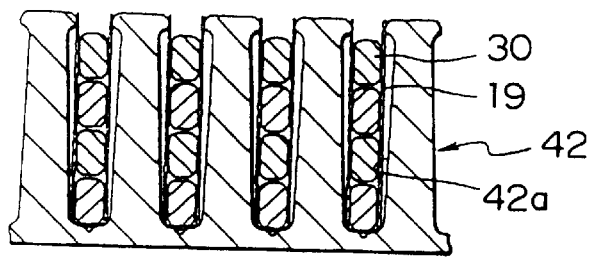
FIG. 12C is a diagram explaining the method of manufacture for the stator of the alternator according to Embodiment 1 of the present invention.

FIG. 1 is a cross section showing a construction of an alternator according to Embodiment 1 of the present invention, FIGS. 2 and 3 are perspectives showing a stator of this alternator viewed from a rear end and a front end, respectively, FIG. 4 is a rear end elevation explaining connections in one stator winding phase portion in this alternator, and FIG. 5 is a circuit diagram for this alternator. FIGS. 6 to 9 are diagrams explaining a winding assembly forming process in a method of manufacture for the stator of the alternator according to Embodiment 1 of the present invention, and FIG. 10 is a plain showing the winding assembly used in the stator of the alternator according to Embodiment 1 of the present invention. FIG. 11 is a perspective showing the stator of the alternator according to Embodiment 1 of the present invention, and FIGS. 12A, 12B, and 12C are diagrams explaining the method of manufacture for the stator of the alternator according to Embodiment 1 of the present invention. Moreover, in FIGS. 2 and 3, crossover connections, neutral points, and output wires have been omitted.

In FIG. 1, an automotive alternator is constructed by rotatably mounting a Lundell-type rotor 7 by means of a shaft 6 inside a case 3 constructed from an aluminum front bracket 1 and an aluminum rear bracket 2, and fastening a stator 8 to an inner wall of the case 3 so as to cover an outer circumferential side of the rotor 7.

The shaft 6 is rotatably supported in the, front bracket 1 and the rear bracket 2. A pulley 4 is fastened to a first end of this shaft 6 so that rotational torque from an engine can be transmitted to the shaft 6 by means of a belt (not shown).

Slip rings 9 for supplying electric current to the rotor 7 are fastened to a second end of the shaft 6, and a pair of brushes 10 are housed in a brush holder 11 disposed inside the case such that the pair of brushes 10 slide in contact with the slip rings 9. A regulator 18 for adjusting the magnitude of alternating voltage generated in the stator 8 is fastened by adhesive to a heat sink 17 fitted onto the brush holder 11. Rectifiers 12 which are electrically connected to the stator 8 and convert alternating current generated in the stator 8 into direct current are mounted inside the case 3.

The rotor 7 is composed of a rotor coil 13 for generating magnetic flux by passing an electric current, and a pair of pole cores 20 and 21 disposed so as to cover the rotor coil 13, magnetic poles being formed in the pole cores 20 and 21 by magnetic flux generated in the rotor coil 13. The pair of pole cores 20 and 21 are made of iron, each has eight claw-shaped magnetic poles 22 and 23 disposed on an outer circumferential perimeter at even pitch in a circumferential direction so as to project axially, and the pole cores 20 and 21 are fastened to the shaft 6 facing each other such that the claw-shaped magnetic poles 22 and 23 internesh. In addition, fans 5 are fastened to first and second axial ends of the rotor 7.

Front-end and rear-end air intake openings 1a and 2a are disposed in axial end surfaces of the front bracket 1 and the rear bracket 2, and front-end and rear-end air discharge openings 1b and 2b are disposed in two outer circumferential shoulder portions of the front bracket 1 and the rear bracket 2, opposite the radial outside of front-end and rear-end coil ends 16f and 16r of the stator winding 16.

As shown in FIGS. 2 and 3, the stator 8 includes: a cylindrical stator core 15 composed of a laminated core formed with a number of slots 15a extending axially at a predetermined pitch in a circumferential direction; a stator winding 16 wound onto the stator core 15; and insulators 19 installed in each of the slots 15a for electrically insulating the stator winding 16 from the stator core 15. The stator winding 16 includes a number of winding sub-portions in each of which one strand of wire 30 is folded over outside the slots 15a at end surfaces of the stator core 15 and wound so as to alternately occupy an inner layer and an outer layer in a slot depth direction within slots 15a a predetermined number of slots apart, being wound into a lap winding having two turns in each lap. In addition, four strands of wire 30 are disposed in one row in the slot depth direction within each of the slots 15a, turn portions of the strands of wire 30 which are formed by being folded over outside the slots 15a at the front end of stator core 15 being disposed in a circumferential direction so as to be aligned in two rows in a radial direction constituting the front-end coil end group 16f, and turn portions of the strands of wire 30 which are formed by being folded over outside the slots 15a at the rear end of stator core 15 being disposed in a circumferential direction so as to overlap in two layers in an axial direction constituting the rear-end coil end group 16r.

In this case, the stator core 15 is formed with ninety-six slots 15a at even pitch so as to house two three-phase alternating-current windings 160 such that the number of slots housing each phase portion of the alternating-current windings 160 corresponds to the number of magnetic poles (sixteen) in the rotor 7. In other words, there are two slots per pole per phase. Long, insulated copper wire material having a rectangular cross section, for example, is used in the strands of wire 30.

Next, the winding construction of one stator winding phase portion 161 will be explained in detail with reference to FIG. 4. In FIG. 4, the rear-end wiring of the strands of wire is indicated by solid lines, the front-end wiring of the strands of wire is indicated by broken lines, and the connecting portions of the strands of wire are indicated by black dots.

One stator winding phase portion 161 is constituted by first and second winding sub-portions 31 and 32 each composed of one strand of wire 30.

The first winding sub-portion 31 is constructed into a lap winding having two turns per lap in which, in pairs of slots constituted by Slot Numbers (12m+1) and Slot Numbers (12m+7) of the slots 15a, one strand of wire 30 is passed from the rear end to the front end in the first address of Slot Numbers (12m+1) of the slots 15a, then passed from the front end to the rear end in the second address of Slot Numbers (12m+7) of the slots 15a, thereafter passed from the rear end to the front end in the third address of Slot Numbers (12m+1) of the slots 15a, and then passed from the front end to the rear end in the fourth address of Slot Numbers (12m+7) of the slots 15a. Here, m=0, 1, 2, . . . 7.

The second winding sub-portion 32 is constructed into a lap winding having two turns per lap in which, in pairs of slots constituted by Slot Numbers (12m+7) and Slot Numbers {12(m+1)+1} of the slots 15a, one strand of wire 30 is passed from the rear end to the front end in the first address of Slot Numbers (12m+7) of the slots 15a, then passed from the front end to the rear end in the second address of Slot Numbers {12(m+1)+1} of the slots 15a, thereafter passed from the rear end to the front end the third address of Slot Numbers (12m+7) of the slots 15a, and then passed from the front end to the rear end in the fourth address of Slot Numbers {12(m+1)+1} of the slots 15a. Here, Slot Number 97 corresponds to Slot Number 1.

Thus, each of the first and second winding sub-portions 31 and 32 constitutes a winding sub-portion in which a single strand of wire 30 is wound into a lap winding having two turns per lap so as to alternately occupy an inner layer and an outer layer in a slot depth direction in every sixth slot 15a. Four strands of wire 30 are disposed to line up in one row in a radial direction within each slot 15a with the longitudinal direction of the rectangular cross sections thereof aligned in a radial direction.

Next, at the rear end of the stator core 15, the turn portion of the first winding sub-portion 31 linking the fourth address of Slot Number 43 and the first address of Slot Number 49 is cut, and the turn portion of the second winding sub-portion 32 linking the third address of Slot Number 43 and the second address of Slot Number 49 is also cut. Then, a first cut end 31a of the first winding sub-portion 31 extending from the fourth address of Slot Number 43 and a second cut end 32b of the second winding sub-portion 32 extending from the second address of Slot Number 49 are crossover-connected by arc welding, for example, to connect the first and second winding sub-portions 31 and 32 in series. Thus, a stator winding phase portion 161 having four turns is formed.

A first cut end 32a of the second winding sub-portion 32 extending from the third address of Slot Number 43 and a second cut end 31b of the first winding sub-portion 31 extending from the first address of Slot Number 49 become a neutral point (N) and an output wire (O), respectively, of the stator winding phase portion 161.

Thus, a total of six stator winding phase portions 161 are formed by installing the strands of wire 30 into the stator core 15 such that the slots 15a into which the strands of wire 30 are inserted are offset by one slot at a time and connecting the strands of wire 30. Thus, the stator 8 obtained includes the stator winding 16 which is wound into the stator core 15 as shown in FIGS. 2 and 3.

As shown in FIG. 5, the two three-phase alternating-current windings 160 are constructed by star-connecting such that the three stator winding phase portions 161 therein have a phase, difference corresponding to an electrical angle of 120° from each other. Furthermore, the two three-phase alternating-current windings 160 are wound onto the stator core 15 so as to have a phase difference of 300 from each other. Each of these two three-phase alternating-current windings 160 is connected to its own rectifier 12. The rectifiers 12 are connected in parallel such that the direct-current output from each is combined.

In the alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized with north-seeking (N) poles by this magnetic flux, and the claw-shaped magnetic poles 23 of the second pole core 21 are magnetized with south-seeking (S) poles. At the same time, rotational torque from the engine is transmitted through the belt and the pulley 4 to the shaft 6, rotating the rotor 7. Thus, a rotating magnetic field is applied to the stator winding 16, generating electromotive force in the stator winding 16. This alternating electromotive force passes through rectifiers 12 and is converted into direct current, the output thereof is adjusted by a regulator 18, and the battery is recharged.

At the rear end, external air is drawn in through the rear-end air intake openings 2a disposed opposite heat sinks of the rectifiers 12 and a heat sink 17 of the regulator 18, respectively, by rotation of the fan 5, flowing along the axis of the shaft 6, cooling the rectifiers 12 and the regulator 18, and is then deflected centrifugally by the fan 5, cooling the rear-end coil end group 16r of the stator winding 16 before being expelled to the outside through the rear-end air discharge openings 2b. At the same time, at the front end, external air is drawn in axially through the front-end air intake openings 1a by the rotation of the fan 5, and is then deflected centrifugally by the fan 5, cooling the front-end coil end group 16f of the stator winding 16 before being expelled to the outside through the front-end air discharge openings 1b.

Thus, heat generated in the rectifiers 12, the regulator 18, the stator 8, the rotor 7, etc., is dissipated, and temperature increases in these heat-generating components are suppressed.

In Embodiment 1, the stator winding phase portions 161 constituting the stator winding 16 include the first and second winding sub-portions 31 and 32 which are each formed by one strand of wire 30. The first and second winding sub-portions 31 and 32 are each formed into a lap winding having two turns per lap by winding one strand of wire 30 in order one turn at a time into pairs of slots, the slots in each pair being six slots apart and each pair being disposed at a pitch of twelve slots, the first and second winding sub-portions 31 and 32 also being formed so as to alternately occupy an inner layer and an outer layer in a slot depth direction in every sixth slot 15a. Four strands of wire 30 are disposed to line up in one row in a slot depth direction within each slot 15a. The turn portions of the strands of wire 30 which link different layers in slots 15a six slots apart at the end surfaces of the stator core 15 constitute the coil ends.

At the front end of the stator core 15, the turn portions linking the first address (a first layer) to the second address (a second layer) and the turn portions linking the third address (a third layer) to the fourth address (a fourth layer) are formed into a substantially identical shape, mutually spaced circumferentially and radially, and disposed neatly in a circumferential direction in two rows to form the front-end coil end group 16f. At the rear end of the stator core 15, the turn portions linking the first address (the first layer) to the fourth address (the fourth layer) and the turn portions linking the second address (the second layer) to the third address (the third layer) are mutually spaced in an axial direction and formed into two layers, mutually spaced circumferentially, and disposed neatly in a circumferential direction to form the rear-end coil end group 16r.

In the stator 8 constructed in this manner, because the coil ends are constituted by the turn portions of the strands of wire 30, that is, by continuous wires, the number of joints can be significantly reduced, enabling the coil end height to be lowered, softening of the strands of wire 30 due to temperature increases during welding to be reduced, and reductions in rigidity of the stator to be suppressed compared to the conventional stator 90 in which the coil ends are constructed by clamping portions of the end portions 95c and 96c of the U-shaped large segments 95 and the small segments 96 in a jig and welding the end portions 95c and 96c together. As a result, an alternator can be provided in which coil leakage reactance in the coil end portions is reduced, improving output, wind resistance is reduced, alleviating wind noise, and deterioration in rigidity is reduced, reducing magnetic noise, compared to an alternator mounted with the conventional stator 90.

The coil end groups 16f and 16r can be formed into a generally identical shape circumferentially, suppressing circumferential irregularities on radially inner edge surfaces of the coil end groups 16f and 16r, enabling wind noise generated between the rotor 7 and the coil end groups 16a and 16b to be reduced Because the axial height of the coil end groups 16f and 16r is lowered and the number of joint portions is reduced, interference noise between the cooling air flow formed by the fans 5 and the coil end groups 16f and 16r is also reduced.

Next, the assembly of the stator 8 will be explained with reference to FIGS. 6 to 12.

Figure 6:
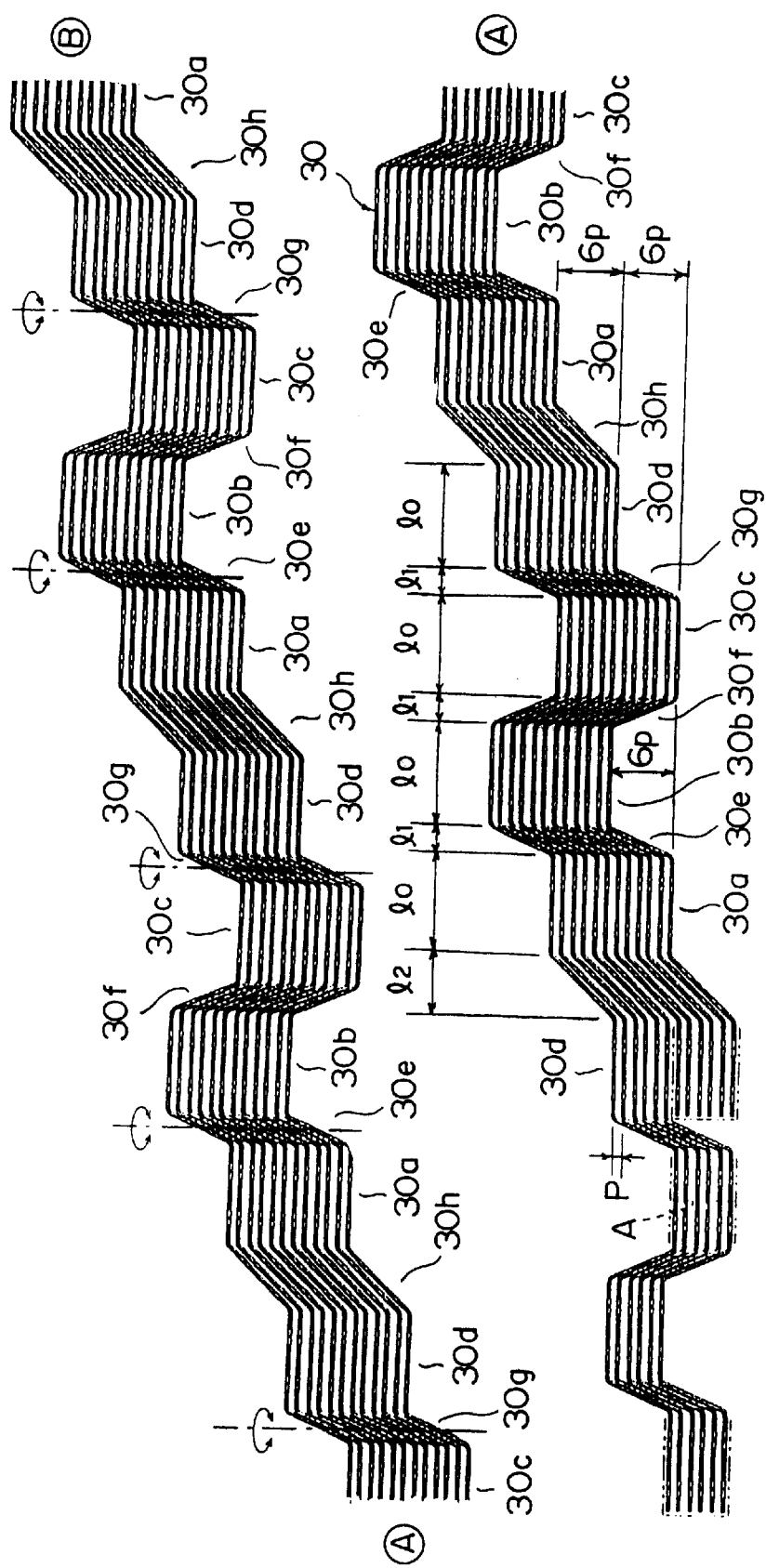
FIG. 6 is a diagram explaining a winding assembly forming process in a method of manufacture for the stator of the alternator according to Embodiment 1 of the present invention.
Figure 7:
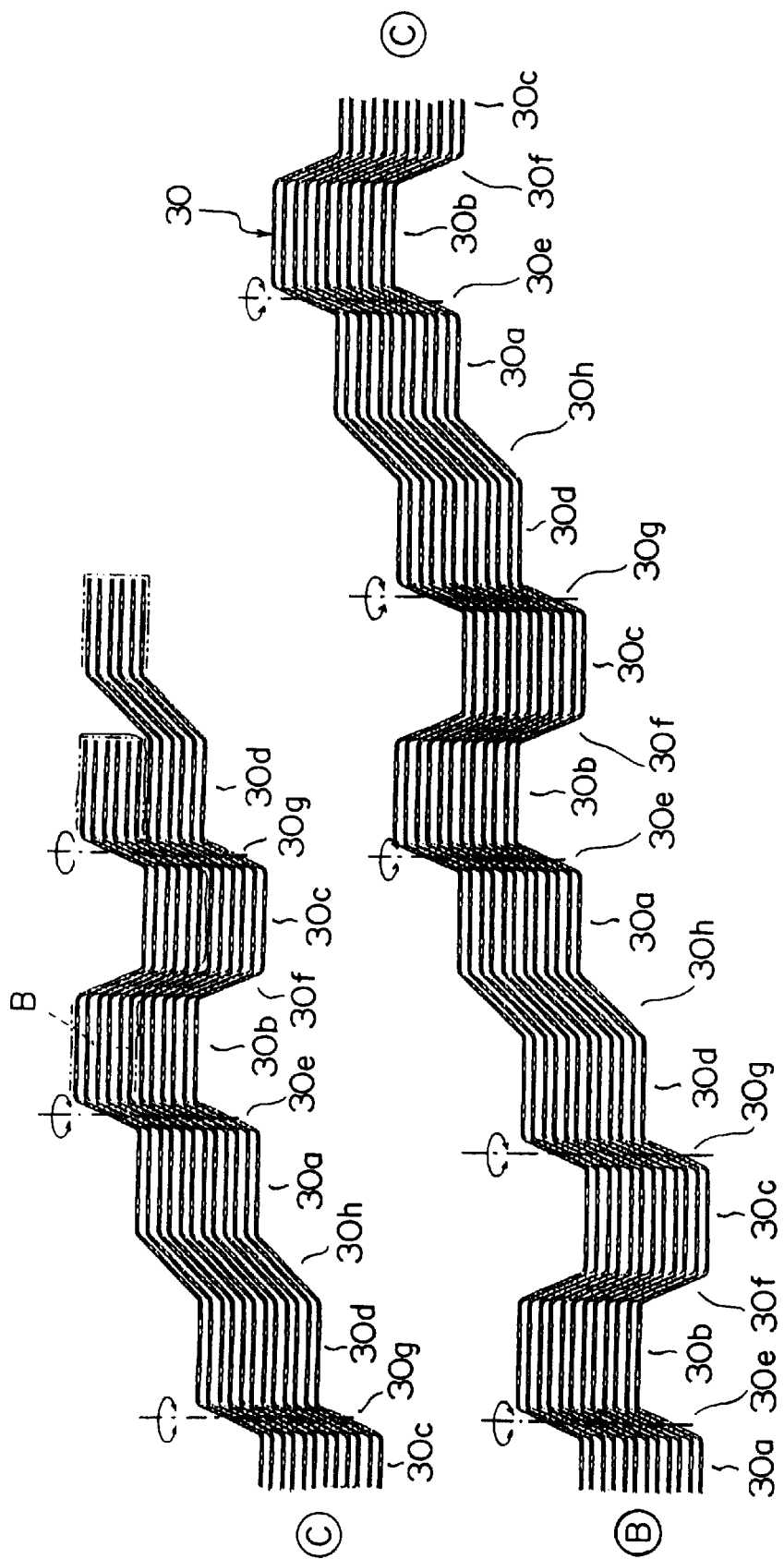
FIG. 7 is a diagram explaining the winding assembly forming process in the method of manufacture for the stator of the alternator according to Embodiment 1 of the present invention.

First, twelve long strands of wire 30 are disposed parallel to each other at a pitch (p) of one slot and simultaneously folded and bent in the same plane to form a lightning-bolt shape. As shown in FIGS. 6 and 7, this group of strands of wire 30 folded and bent into the lightning-bolt shape is formed by repeating a basic pattern a predetermined number of times, the basic pattern being formed by the first to fourth straight portions 30a to 30d which have a length ($l_0$) equivalent to the groove length of the slots 15a, in which the first and second straight portions 30a and 30b are offset at a pitch of six slots (6p) on a first side in a direction of disposal of the strands of wire 30 and linked by first inclined portions 30e, the second and third straight portions 30b and 30c are offset at a pitch of six slots (6p) on a second side in the direction of disposal of the strands of wire 30 and linked by second inclined portions 30f, and the third and fourth straight portions 30c and 30d are offset at a pitch of six slots (6p) on the first side in the direction of disposal of the strands of wire 30 and linked by third inclined portions 30g, this basic pattern being repeated such that adjacent fourth and first straight portions 30d and 30a are offset at a pitch of six slots (6p) on the first side in the direction of disposal of the strands of wire 30 and linked by fourth inclined portions 30h. At this time, spacing between each of the first to fourth straight portions 30a to 30d is $l_1$, and spacing $l_1$ between the adjacent first and fourth straight portions 30a and 30d is formed so as to be larger than the spacing $l_1$.

Figure 8:
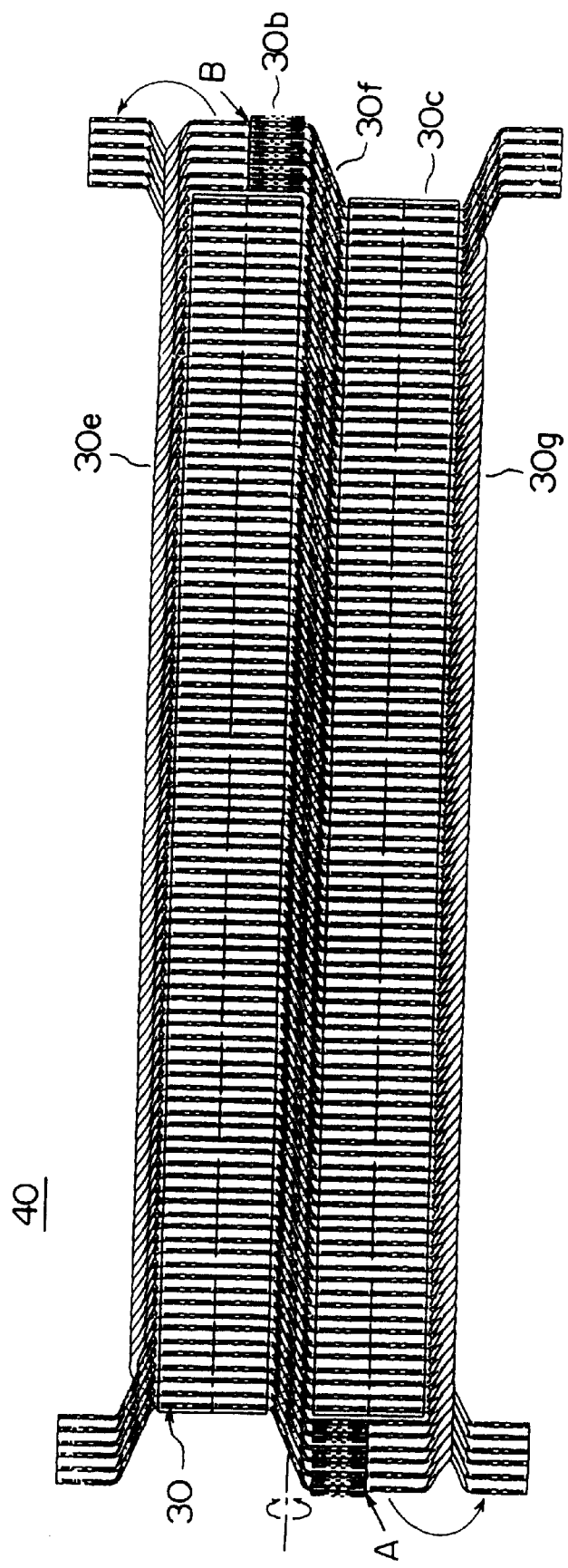
FIG. 8 is a diagram explaining the winding assembly forming process in the method of manufacture for the stator of the alternator according to Embodiment 1 of the present invention.

Then, as indicated by arrows in FIGS. 6 and 7, a flattened cylindrical body 40 is formed in which the second and third straight portions 30b and 30c which are linked by the second inclined portions 30f and the fourth and first straight portions 30d and 30a which are linked by the fourth inclined portions 30h are wound helically so as to alternately occupy a first plane and a second plane by folding over the first and third inclined portions 30e and 30g in the same direction at central portions thereof. As shown in FIG. 8, this cylindrical body 40 is constructed by arranging the second and third straight portions 30b and 30c, which are linked by the second inclined portions 30f, at a pitch of one slot in the first plane, and arranging the fourth and first straight portions 30d and 30a, which are linked by the fourth inclined portions 30h, at a pitch of one slot in the second plane.

Then, as shown in FIG. 8, terminal processing is performed by cutting six of the third straight portions 30c at central portions A at a first end portion of the cylindrical body 40, and cutting six of the second straight portions 30b at central portions B at a second end portion of the cylindrical body 40 to form connecting portions with other end portions of the strands of wire 30.

Figure 9:
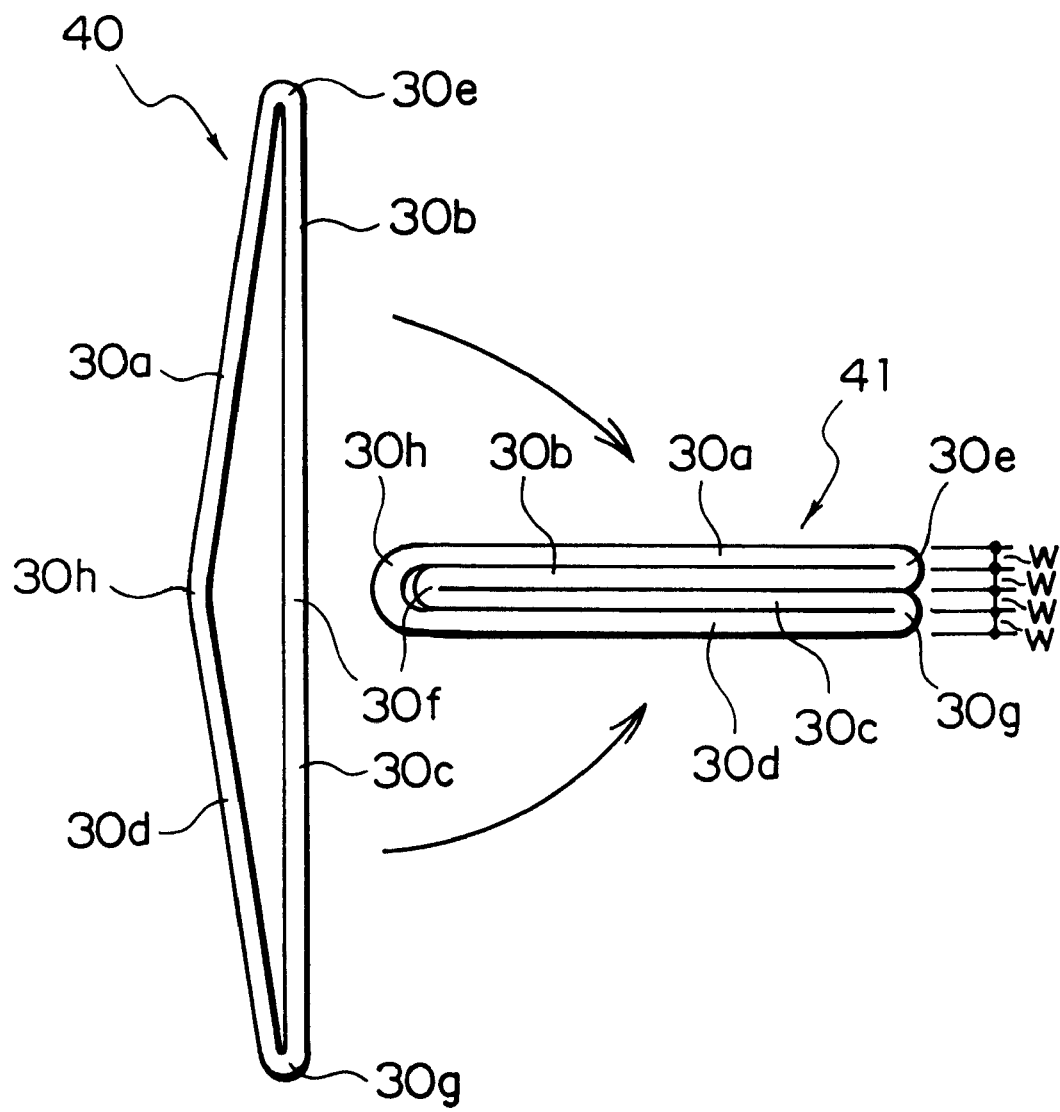
FIG. 9 is a diagram explaining the winding assembly forming process in the method of manufacture for the stator of the alternator according to Embodiment 1 of the present invention.
Figure 10:
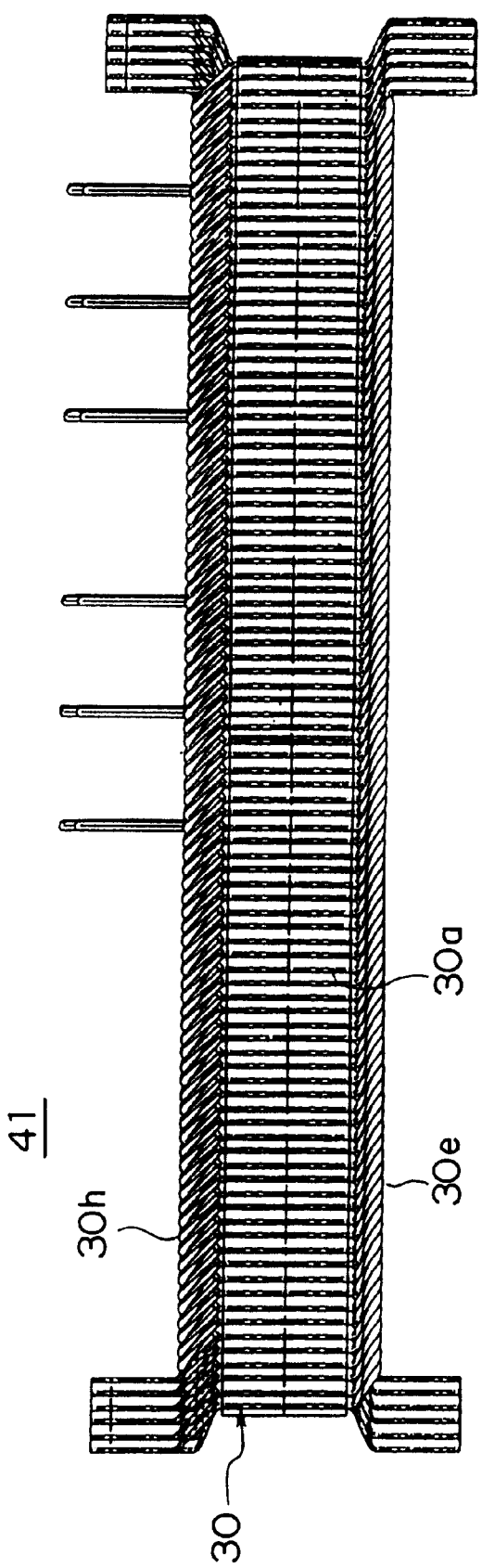
FIG. 10 is a plan showing the winding assembly used in the stator of the alternator according to Embodiment 1 of the present invention.

Thereafter, a winding assembly 41, shown in FIG. 10, is prepared by folding over the cylindrical body 40 at central portions of the second inclined portions 30f and the fourth inclined portions 30h which are disposed at a pitch of one slot such that the second straight portions 30b and the third straight portions 30c face each other, as indicated by arrows in FIGS. 8 and 9.

In this winding assembly 41, the first to fourth straight portions 30a to 30d are disposed at a pitch p so as to be lined up in four layers at a pitch w equal to the width of the strands of wire 130 in the width direction of the strands of wire 30, on a first side of which the folded first inclined portions 30e, which function as first turn portions, and the folded third inclined portions 30g, which function as third turn portions, are disposed at a pitch of one slot in the direction of disposal of the straight portions to form two rows. On a second side, the folded second inclined portions 30f, which function as second turn portions, and the folded fourth inclined portions 30h, which function as fourth turn portions, are disposed at a pitch of one slot in the direction of disposal of the straight portions to form two layers.

Here, lead portions of the output wires and the neutral points extend outwards from the fourth inclined portions 30h of the winding assembly 41, and these lead portions are formed by drawing out specific strands of wire 30 during the process of folding and bending the strands of wire 30 into the lightning-bolt shape.

Meanwhile, a parallelepiped laminated core 42 is prepared as shown in FIG. 11 by laminating a predetermined number of sheets of SPCC material which is a magnetic material formed with trapezoidal slots 42a at a predetermined pitch (an electrical angle of 30°) and laser welding an outer portion thereof.

As shown in FIG. 12A, the insulators 19 are mounted in the slots 42a of the laminated core 42, and the first to fourth straight portions 30a to 30d of the winding assembly 41 are inserted so as to stack up within each of the slots 42a. Thus, the winding assembly 41 is installed in the laminated core 42 as shown in FIG. 12B. At this time, straight portions of the strands of wire 30 are housed in lines of four in a radial direction within the slots 42a and are electrically insulated from the laminated core 42 by the insulators 19.

Next, the laminated core 42 is rolled up and its ends abutted and welded to each other to obtain the cylindrical stator core 15, as shown in FIG. 12C.

Then, end portions of the same strand of wire 30 are connected so that first and second winding sub-portions 31 and 32 which are wound into slot groups disposed at a pitch of six slots each form lap windings having two turns per lap. Then, as explained previously, the two three-phase alternating-current windings 160 are obtained by cutting each of the lead portions of the winding assembly 41, forming the crossover connections, then connecting the neutral points.

Thus, the stator 8 obtained is formed by installing the stator winding 16 composed of the two three-phase alternating-current windings 160 into the stator core 15.

Thus, in Embodiment 1, because the winding assembly 41 is formed by arranging the twelve strands of wire 30 in the same plane at a pitch of one slot, folding and bending the twelve strands of wire 30 to form the lightning-bolt shaped pattern shown in FIGS. 6 and 7, forming the cylindrical body 40 in which the second and third straight portions 30b and 30c which are linked by the second inclined portions 30f and the fourth and first straight portions 30d and 30a which are linked by the fourth inclined portions 30h are wound helically by folding back the first and third inclined portions 30e and 30g in the same direction at central portions thereof, and then folding the cylindrical body 40 over at central portions of the second and fourth inclined portions 30f and 30h, a winding assembly can be easily manufactured which alternately occupies an inner layer and an outer layer in a slot depth direction in every sixth slot 15a and constitutes a lap winding having two turns per lap.

Because the winding assembly 41 prepared in this manner is used, six stator winding phase portions 161 can be installed into the stator core 15 by installing one winding assembly 41 into the stator core 15. Thus, the complex operation of inserting a large number of segments into the slots of the stator core and joining the end portions thereof together one by one is no longer required, significantly improving assembly and workability, thereby enabling producibility to be increased. In addition, cases in which the number of turns in the stator winding is increased can easily be adapted for by stacking and installing a plurality of the winding assemblies 41 into the stator core 15.

Because the coil ends are constituted by the turn portions of the strands of wire 30, the number of joints in the coil end groups 16f and 16r is significantly reduced. Thus, there is no need to extend the coil ends out by an extra amount from the end surfaces of the stator core 15, enabling the stator 8 to be reduced in size. In addition, because the occurrence of short-circuiting accidents which accompany loss of insulation due to the joining process can be suppressed, superior insulation can be obtained and high yield can also be achieved. In addition, reductions in resistance to corrosion which accompany loss of insulation due to joining can be suppressed.

Here, an explanation will be given of a winding construction previously proposed by the present applicants in Japanese Patent Application No. 2000-011704, for comparison with the present application.

Figure 13:
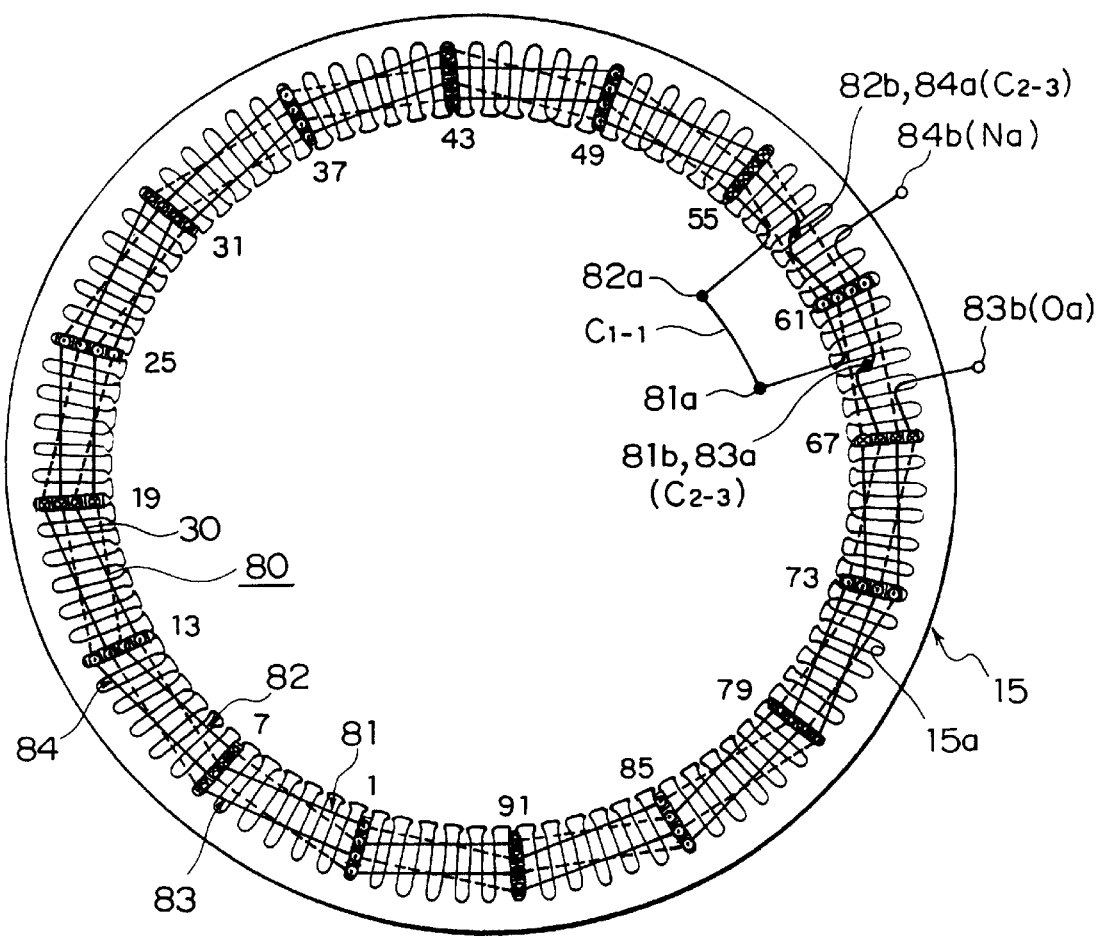
FIG. 13 is a rear end elevation explaining connections in one stator winding phase portion in an alternator of a comparative example.

FIG. 13 is a rear end elevation explaining connections in one stator winding phase portion described in Japanese Patent Application No. 2000-011704.

In FIG. 13, one stator winding phase portion 80 is composed of first to fourth winding sub-portions 81 to 84 each formed from one strand of wire 30. The first winding sub-portion 81 is constructed by wave winding one strand of wire 30 into every sixth slot from Slot Numbers 1 to 91 so as to alternately occupy the first address and the second address inside the slots 15a. The second winding sub-portion 82 is constructed by wave winding a strand of wire 30 into every sixth slot from Slot Numbers 1 to 91 so as to alternately occupy the second address and the first address inside the slots 15a. The third winding sub-portion 83 is constructed by wave winding a strand of wire 30 into every sixth slot from Slot Numbers 1 to 91 so as to alternately occupy the third address and the fourth address inside the slots 15a. The fourth winding sub-portion 84 is constructed by wave winding a strand of wire 30 into every sixth slot from Slot Numbers 1 to 91 so as to alternately occupy the fourth address and the third address inside the slots 15a.

Thus, each of the first to fourth winding sub-portions 81 to 84 constitutes a winding sub-portion having one turn in which a single strand of wire 30 is wound into every sixth slot 15a so as to alternately occupy an inner layer and an outer layer in a slot depth direction.

Moreover, although not shown, a total of six stator winding phase portions 80 are formed by offsetting the slots 15a into which the strands of wire 30 are wound by one slot each.

At a first end of the stator core 15, a crossover connection (adjacent-address crossover connection $C_{2-3}$) is formed between a second end portion 81b of the first winding sub-portion 81 extending outwards from the second address of Slot Number 67 and a first end portion 83a of the third winding sub-portion 83 extending outwards from the third address of Slot Number 61, and a crossover connection (adjacent-address crossover connection $C_{2-3}$) is formed between a second end portion 82b of the second winding sub-portion 82 extending outwards from the second address of Slot Number 61 and a first end portion 84a of the fourth winding sub-portion 84 extending outwards from the third address of Slot Number 55, and in addition, a crossover connection (same-address crossover connection $C_{1-1}$) is formed between a first end portion 81a of the first winding sub-portion 81 extending outwards from the first address of Slot Number 61 and a first end portion 82a of the second winding sub-portion 82 extending outwards from the first address of Slot Number 55. Thus, the first to fourth winding sub-portions 81 to 84 are connected in series to form one stator winding phase portion 80 having four turns.

At this time, a second end portion 83b of the third winding sub portion 83 extending outwards from the fourth address of Slot Number 67 and a second end portion 84b of the fourth winding sub-portion 84 extending outwards from the fourth address of Slot Number 61 become an output wire (Oa) and a neutral point (Na), respectively, of one stator winding phase portion 80.

Because the stator winding phase portion 80 of this comparative example is constituted by the first to fourth winding sub-portions 81 to 84 having one turn in each of which one strand of wire 30 is wound into a wave winding so as to alternately occupy an inner layer and an outer layer in a slot depth direction in every sixth slot 15a, the complex operation of inserting a large number of segments into the slots of the stator core and joining the end portions thereof together one by one is no longer required, significantly improving assembly and workability, thereby enabling producibility to be increased.

In addition, because the coil ends are constituted by the turn portions of the strands of wire 30, the number of joints in the coil end groups is significantly reduced. Thus, there is no need to extend the coil ends out by an extra amount from the end surfaces of the stator core 15, enabling the stator to be reduced in size.

However, because this stator winding phase portion 80 is constituted by the first to fourth winding sub-portions 81 to 84 which are each formed by winding one strand of wire 30 into a wave winding, three crossover connections are required in order to connect the first to fourth winding sub-portions 81 to 84 in series.

By contrast, because the stator winding phase portions 161 in Embodiment 1 of the present invention are each constituted by the first and second winding sub-portions 31 and 32 which are each formed by winding one strand of wire 30 into a lap winding having two turns per lap, one crossover connection is sufficient to connect the first and second winding sub-portions 31 and 32 in series, and it can be seen that the connecting operation can be improved compared to the comparative example. Furthermore, by reducing the number of crossover connections and simplifying the connecting portions, wind noise as a result of circumferential irregularities in the rear-end coil end group 16r is suppressed, enabling noise reductions to be achieved. In addition, because wind resistance in the rear-end coil end group 16r is lessened by reducing the number of crossover connections and simplifying the connecting portions, the volume of air flow increases proportionally, improving the cooling effect.

Embodiment 2

Figure 14:
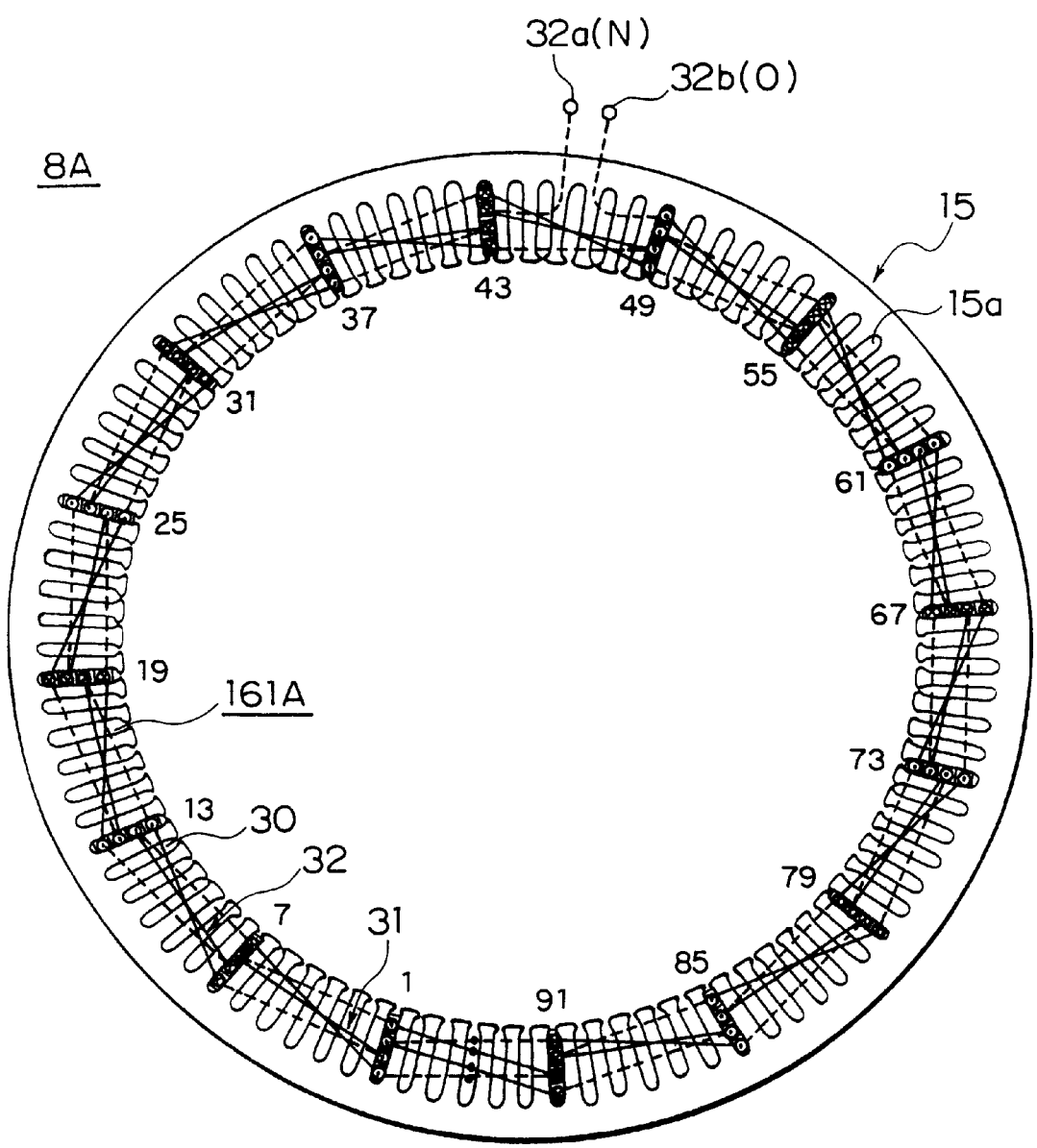
FIG. 14 is a front end elevation explaining connections in one stator winding phase portion in an alternator according to Embodiment 2 of the present invention.

FIG. 14 is a front end elevation explaining connections in one stator winding phase portion in an automotive alternator according to Embodiment 2 of the present invention. In the figure, the rear-end wiring of the strands of wire is indicated by solid lines, the front-end wiring of the strands of wire is indicated by broken lines, and the connecting portions of the strands of wire are indicated by black dots.

One stator winding phase portion 161A is constituted by first and second winding sub-portions 31 and 32 each composed of one strand of wire 30.

The first winding sub-portion 31 is constructed into a lap winding having two turns per lap in which, in pairs of slots constituted by Slot Numbers (12m+1) and Slot Numbers (12m+7) of the slots 15a, one strand of wire 30 is passed from the front end to the rear end in the first address of Slot Numbers (12m+1) of the slots 15a, then passed from the rear end to the front end in the second address of Slot Numbers (12m+7) of the slots 15a, thereafter passed from the front end to the rear end in the third address of Slot Numbers (12m+1) of the slots 15a, and then passed from the rear end to the front end in the fourth address of Slot Numbers (12m+7) of the slots 15a. Here, m=0, 1, 2, ... 7.

The second winding sub-portion 32 is constructed into a lap winding having two turns per lap in which, in pairs of slots constituted by Slot Numbers (12m+7) and Slot Numbers {12(m+1)+1} of the slots 15a, one strand of wire 30 is passed from the front end to the rear end in the first address of Slot Numbers (12m+7) of the slots 15a, then passed from the rear end to the front end in the second address of Slot Numbers {12(m+1)+1} of the slots 15a, thereafter passed from the front end to the rear end the third address of Slot Numbers (12m+7) of the slots 15a, and then passed from the rear end to the front end in the fourth address of Slot Numbers {12(m+1)+1} of the slots 15a. Here, Slot Number 97 corresponds to Slot Number 1.

Thus, each of the first and second winding sub-portions 31 and 32 constitutes a winding sub-portion in which a single strand of wire 30 is wound into a lap winding having two turns per lap so as to alternately occupy an inner layer and an outer layer in a slot depth direction in every sixth slot 15a.

Then, a winding portion having 4 turns in which the first and second winding sub-portions 31 and 32 are connected in series is obtained by joining a first end portion of the first winding sub-portion 31 extending towards the front end from the first address of Slot Number 1 to a second end portion of the second winding sub-portion 32 extending towards the front end from the third address of Slot Number 91, and by then joining a first end portion of the second winding sub-portion 32 extending towards the front end from the second address of Slot Number 1 to a second end portion of the first winding sub-portion 31 extending towards the front end from the fourth address of the Slot Number 91.

Next, at the rear end of the stator core 15, the turn portion of the second winding sub-portion 32 linking the third address of Slot Number 43 and the fourth address of Slot Number 49 is cut to form one stator winding phase portion 161A having four turns in which a first cut end 32a of the second winding sub-portion 32 extending from the third address of Slot Number 43 and a second cut end 32b of the second winding sub-portion 32 extending from the fourth address of Slot Number 49 become a neutral point (N) and an output wire (O), respectively.

Thus, a total of six stator winding phase portions 161A are formed by installing the strands of wire 30 into the stator core 15 such that the slots 15a into which the strands of wire 30 are inserted are offset by one slot at a time and connecting the strands of wire 30.

Figure 15:
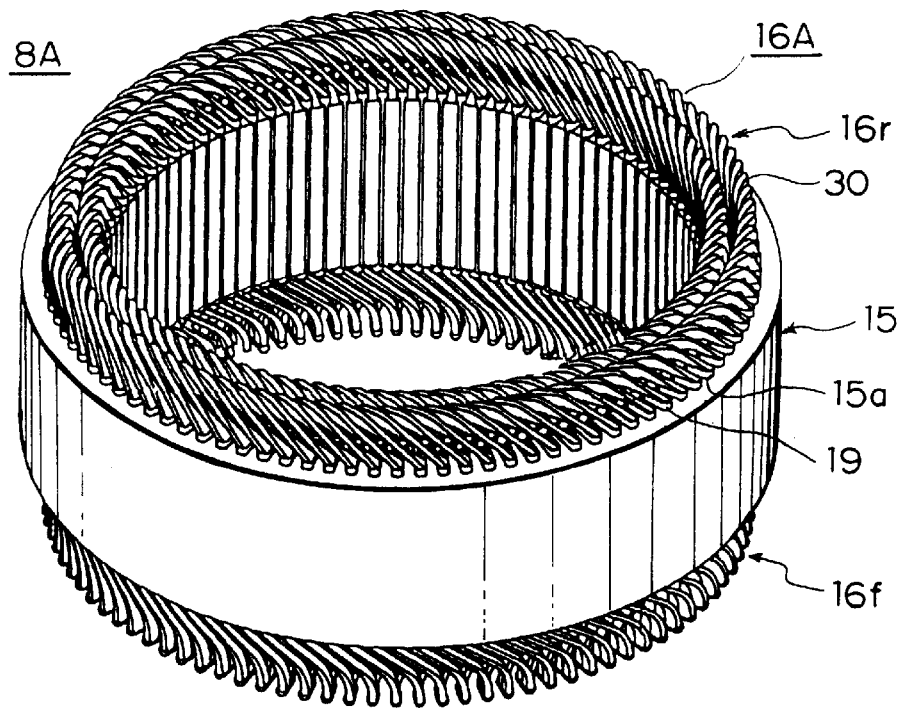
FIG. 15 is a perspective showing a stator of this alternator viewed from the rear end.
Figure 16:
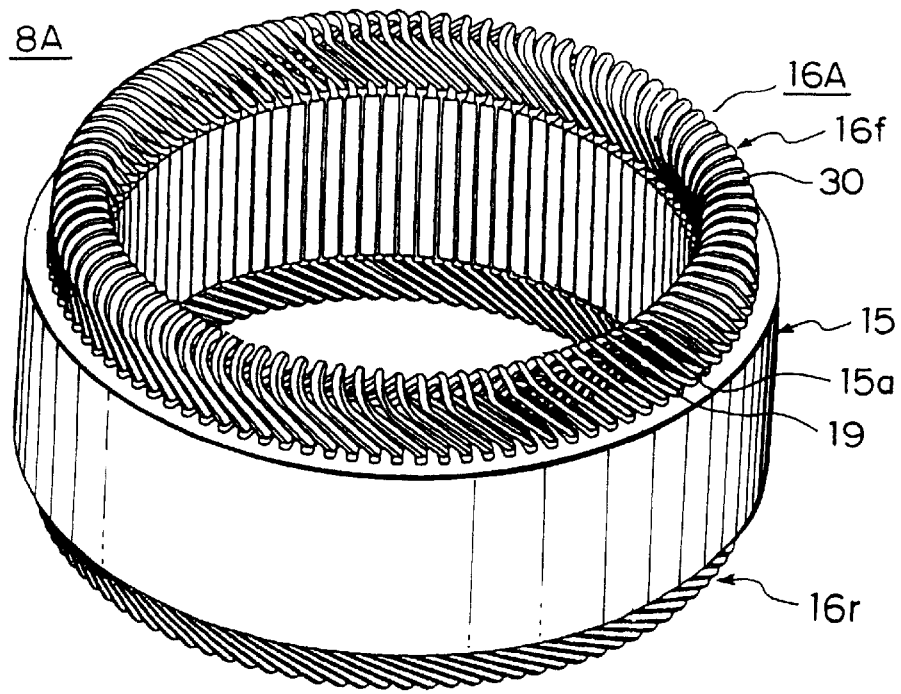
FIG. 16 is a perspective showing a stator of this alternator viewed from the front end.

Thus, a stator 8A obtained includes a stator winding 16A which is wound into the stator core 15 as shown in FIGS. 15 and 16. FIG. 15 is a perspective showing the stator viewed from the rear end and FIG. 16 is a perspective showing the stator viewed from the front end. The neutral points and the output wires have been omitted from these figures.

In Embodiment 2, the stator winding phase portions 161A constituting the stator winding 16A are constituted by the first and second winding sub-portions 31 and 32 which are each formed into a lap winding having two turns per lap by winding one strand of wire 30 in order one turn at a time into pairs of slots, the slots in each pair being six slots apart and the pairs of slots being disposed at a pitch of twelve slots, the first and second winding sub-portions 31 and 32 also being formed so as to alternately occupy an inner layer and an outer layer in a slot depth direction in every sixth slot 15a. Four strands of wire 30 are disposed to line up in one row in a slot depth direction within each slot 15a. The turn portions of the strands of wire 30 which link different layers in slots 15a six slots apart at the end surfaces of the stator core 15 constitute the coil ends.

Consequently, similar effects to those in Embodiment 1 above can also be obtained in Embodiment 2.

According to Embodiment 2, the first and second winding portions 31 and 32 are connected in series to form the winding portion having 4 turns by joining the first end portion of the first winding sub-portion 31 to the second end portion of the second winding sub-portion 32, and joining the first end portion of the second winding sub-portion 32 to the second end portion of the first winding sub-portion 31. Thus, the processes of cutting and joining the first and second winding sub-portions 31 and 32 after installation into the stator core 15, which were required in Embodiment 1 above to form crossover connections between the first and second winding sub-portions 31 and 32, are no longer required. That is, one portion of the second winding sub-portion 32 extending outwards at the rear end in each phase is cut after the first and second winding sub-portions 31 and 32 are installed into the stator core 15, and the cut ends thereof can be used as the neutral point and the output wire, improving workability.

Because a coil end group in which the turn portions constituted by folded portions of the strands of wire 30 are disposed circumferentially to form two rows in a radial direction is disposed at the rear end, wind resistance is reduced in a wind channel at the rear end where rectifiers 12 and a regulator 18 which are heat-generating parts are mounted, enabling the rectifiers 12 and the regulator 18 to be cooled efficiently.

Embodiment 3

Figure 17:
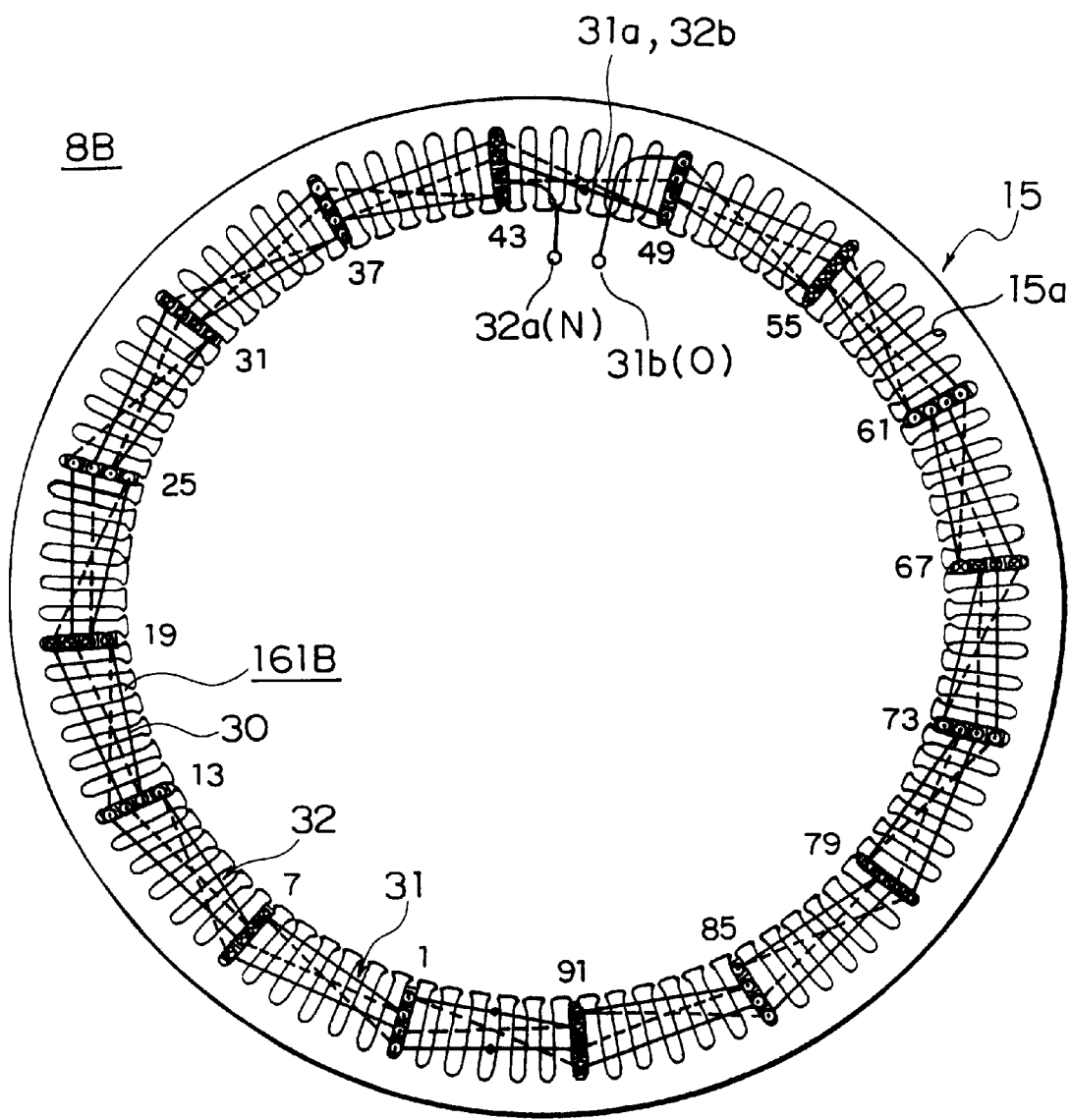
FIG. 17 is a rear end elevation explaining connections in one stator winding phase portion in an alternator according to Embodiment 3 of the present invention.
Figure 18:
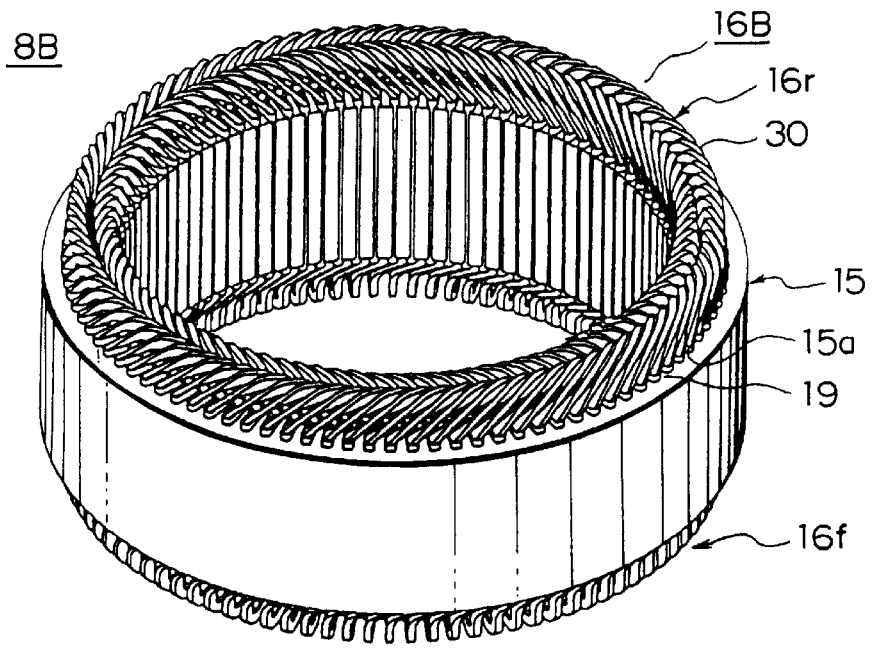
FIG. 18 is a perspective showing a stator of this alternator viewed from the rear end.
Figure 19:
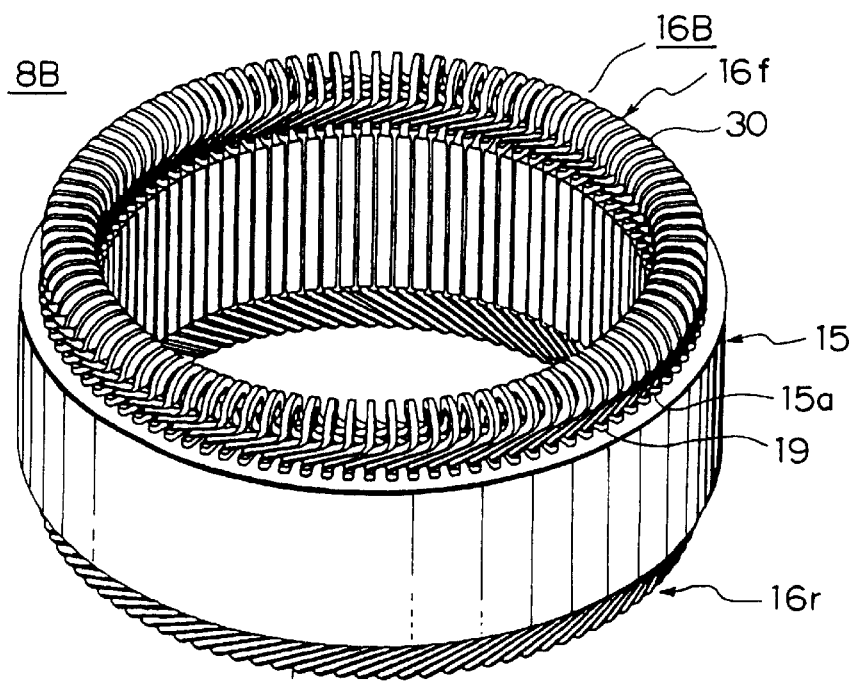
FIG. 19 is a perspective showing the stator of this alternator viewed from the front end.

FIG. 17 is a rear end elevation explaining connections in one stator winding phase portion in an automotive alternator according to Embodiment 3 of the present invention, and FIGS. 18 and 19 are perspectives showing a stator of this alternator viewed from the rear end and the front end respectively. In FIG. 17, the rear-end wiring of the strands of wire is indicated by solid lines, the front-end wiring of the strands of wire is indicated by broken lines, and the connecting portions of the strands of wire are indicated by black dots. In FIGS. 18 and 19, neutral points and output wires have been omitted.

In FIG. 17, one stator winding phase portion 161B is constituted by first and second winding sub-portions 31 and 32 each composed of one strand of wire 30.

The first winding sub-portion 31 is constructed into a lap winding having two turns per lap in which, in pairs of slots constituted by Slot Numbers (12m+1) and Slot Numbers (12m+7) of the slots 15a, one strand of wire 30 is passed from the rear end to the front end in the fourth address of Slot Numbers (12m+1) of the slots 15a, then passed from the front end to the rear end in the first address of Slot Numbers (12m+7) of the slots 15a, thereafter passed from the rear end to the front end in the second address of Slot Numbers (12m+1) of the slots 15a, and then passed from the front end to the rear end in the third address of Slot Numbers (12m+7) of the slots 15a. Here, m=0, 1, 2, . . . 7.

The second winding sub-portion 32 is constructed into a lap winding having two turns per lap in which, in pairs of slots constituted by Slot Numbers (12m+7) and Slot Numbers {12(m+1)+1} of the slots 15a, one strand of wire 30 is passed from the rear end to the front end in the fourth address of Slot Numbers (12m+7) of the slots 15a, then passed from the front end to the rear end in the first address of Slot Numbers {12(m+1)+1} of the slots 15a, thereafter passed from the rear end to the front end the second address of Slot Numbers (12m+7) of the slots 15a, and then passed from the front end to the rear end in the third address of Slot Numbers {12(m+1)+1} of the slots 15a. Here, Slot Number 97 corresponds to Slot Number 1.

First and second end portions of the second winding sub-portion 32 which extend outwards at the rear end from the first address of Slot Number 1 and from the second address of Slot Number 91 are joined, and first and second end portions of the first winding sub-portion 31 which extend outwards at the rear end from the fourth address of Slot Number 1 and from the third address of Slot Number 91 are joined. Thus, each of the first and second winding sub-portions 31 and 32 constitutes a winding sub-portion in which a single strand of wire 30 is wound into a lap winding having two turns per lap so as to alternately occupy an inner layer and an outer layer in a slot depth direction in every sixth slot 15a.

Next, at the rear end of the stator core 15, the turn portion of the first winding sub-portion 31 linking the third address of Slot Number 43 and the fourth address of Slot Number 49 is cut, and the turn portion of the second winding sub-portion 32 linking the second address of Slot Number 43 and the first address of Slot Number 49 is also cut. Then, a first cut end 31a of the first winding sub-portion 31 extending from the third address of Slot Number 43 and a second cut end 32b of the second winding sub-portion 32 extending from the first address of Slot Number 49 are crossover-connected by arc welding, for example, to connect the first and second winding sub-portions 31 and 32 in series. Thus, a stator winding phase portion 161B having four turns is formed.

A first cut end 32a of the second winding sub-portion 32 extending from the second address of Slot Number 43 and a second cut end 31b of the first winding sub-portion 31 extending from the fourth address of Slot Number 49 become a neutral point (N) and an output wire (O), respectively, of the stator winding phase portion 161B.

Thus, a total of six stator winding phase portions 161B are formed by installing the strands of wire 30 into the stator core 15 such that the slots 15a into which the strands of wire 30 are inserted are offset by one slot at a time and connecting the strands of wire 30. Thus, a stator 8B is obtained which includes a stator winding 16B which is wound into the stator core 15 as shown in FIGS. 18 and 19.

In Embodiment 3, the stator winding phase portions 161B constituting the stator winding 16B are constituted by the first and second winding sub-portions 31 and 32 which are each formed into a lap winding having two turns per lap by winding one strand of wire 30 in order one turn at a time into pairs of slots, the slots in each pair being six slots apart and the pairs of slots being disposed at a pitch of twelve slots, the first and second winding sub-portions 31 and 32 also being formed so as to alternately occupy an inner layer and an outer layer in a slot depth direction in every sixth slot 15a. Four strands of wire 30 are disposed to line up in one row in a slot depth direction within each slot 15a. The turn portions of the strands of wire 30 which link different layers in slots 15a six slots apart at the end surfaces of the stator core 15 constitute the coil ends.

Consequently, the same effects can be achieved in Embodiment 3 as in Embodiment 1 above.

According to Embodiment 3, because a coil end group in which the turn portions constituted by folded portions of the strands of wire 30 are disposed circumferentially to form two rows in a radial direction is disposed at the rear end, wind resistance is reduced in a wind channel at the rear end where rectifiers 12 and a regulator 18 which are heat-generating parts are mounted, enabling the rectifiers 12 and the regulator 18 to be cooled efficiently.

Next, the method of manufacture for the winding assembly used in the stator 8B will be explained in detail with reference to FIGS. 20 to 23.

Figure 20:
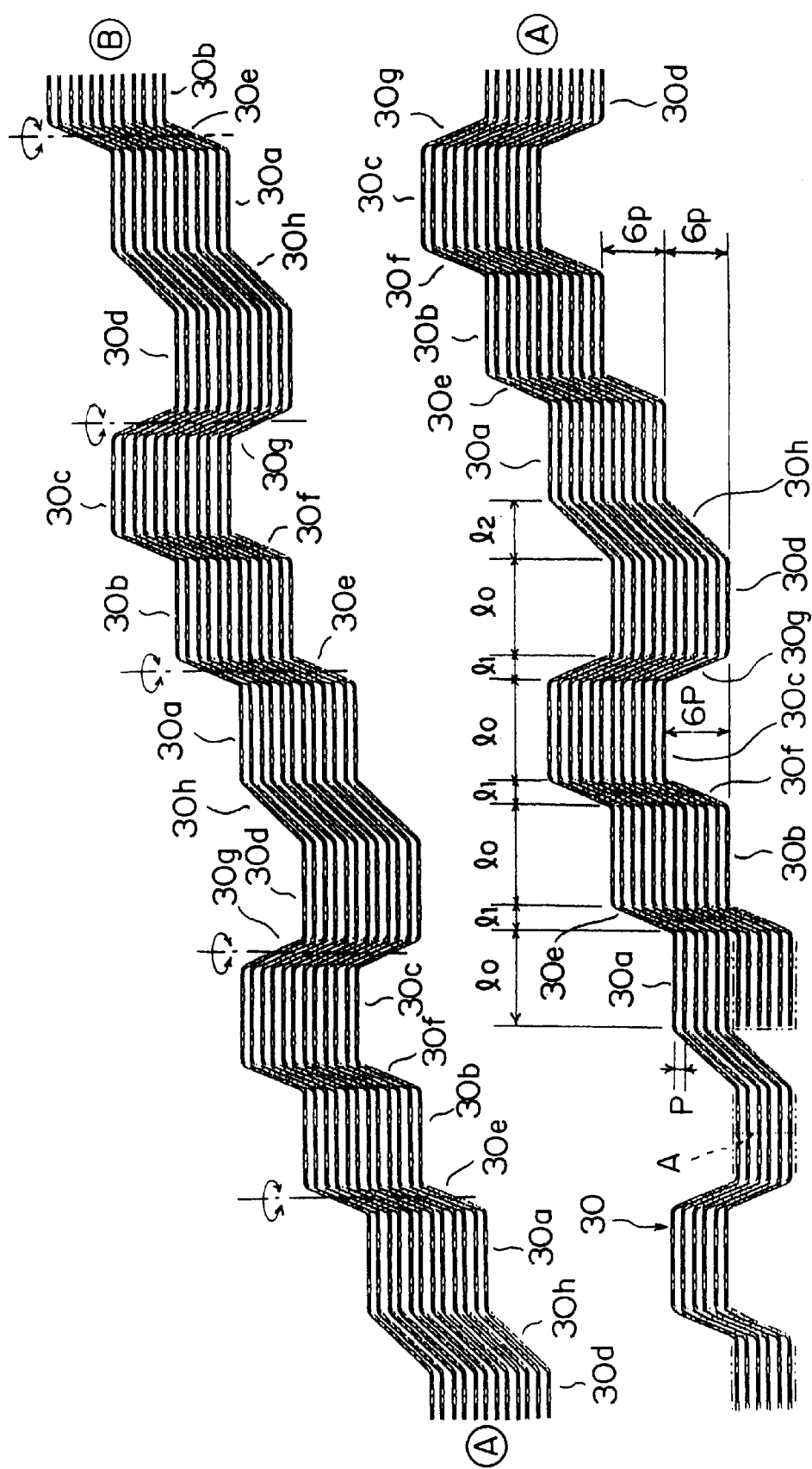
FIG. 20 is a diagram explaining a winding assembly forming process in the method of manufacture for the stator of the alternator according to Embodiment 3 of the present invention.
Figure 21:
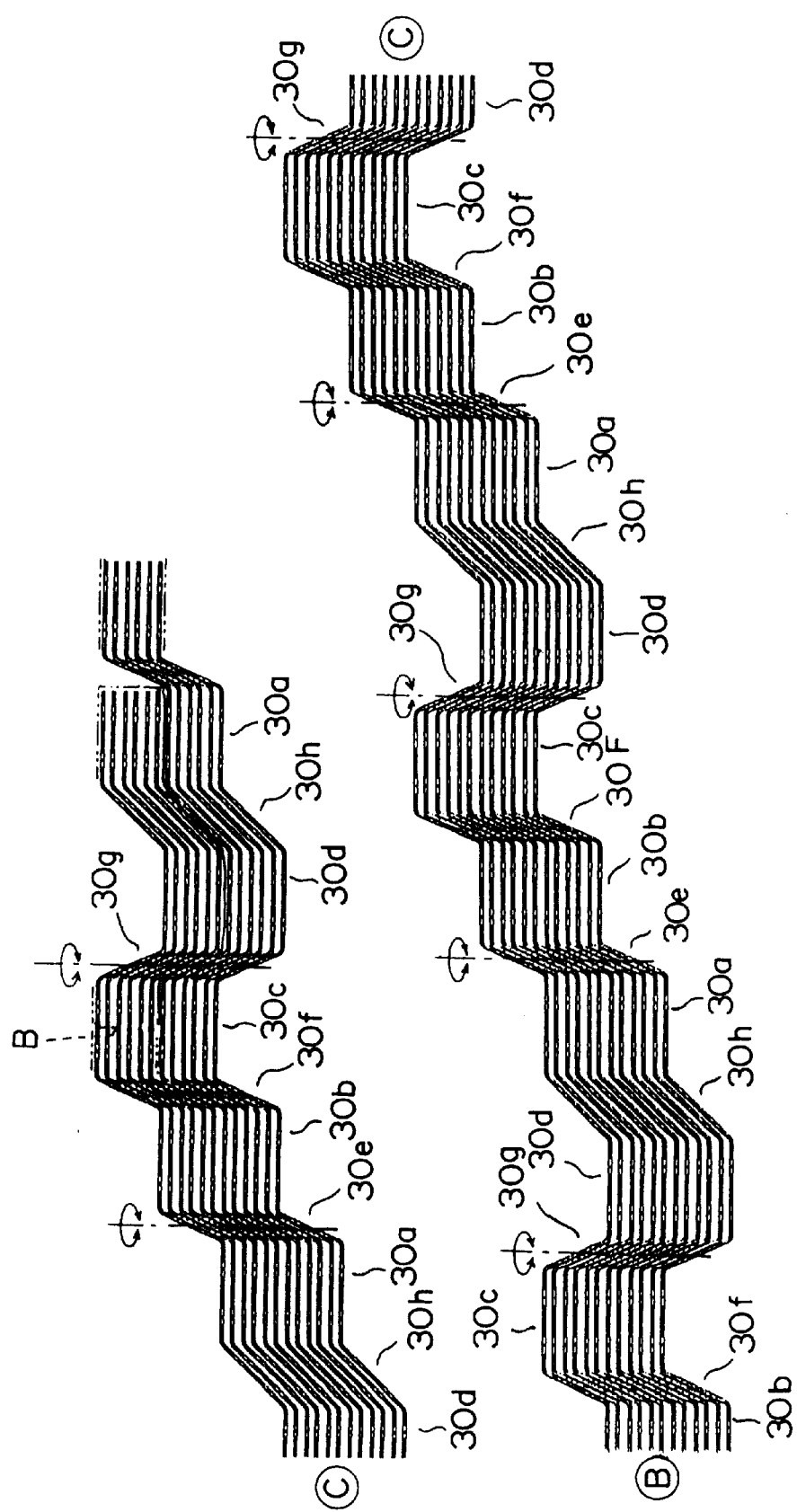
FIG. 21 is a diagram explaining the winding assembly forming process in the method of manufacture for the stator of the alternator according to Embodiment 3 of the present invention.

First, twelve long strands of wire 30 are disposed parallel to each other at a pitch (p) of one slot and simultaneously folded and bent in the same plane to form a lightning-bolt shape. As shown in FIGS. 20 and 21, this group of strands of wire 30 folded and bent into the lightning-bolt shape is formed by repeating a predetermined number of times a basic pattern formed by the first to fourth straight portions 30a to 30d which have a length ($l_0$) equivalent to the groove length of the slots 15a in which the first and second straight portions 30a and 30b are offset at a pitch of six slots (6p) on a first side in a direction of disposal of the strands of wire 30 and linked by first inclined portions 30e, the second and third straight portions 30b and 30c are offset at a pitch of six slots (6p) on the first side in the direction of disposal of the strands of wire 30 and linked by second inclined portions 30f, and the third and fourth straight portions 30c and 30d are offset at a pitch of six slots (6p) on a second side in the direction of disposal of the strands of wire 30 and linked by third inclined portions 30g, this basic pattern being repeated such that adjacent fourth and first straight portions 30d and 30a are offset at a pitch of six slots (6p) on the first side in the direction of disposal of the strands of wire 30 and linked by fourth inclined portions 30h. At this time, spacing between each of the first to fourth straight portions 30a to 30d is $l_1$ and spacing $l_2$ between the adjacent first and fourth straight portions 30a and 30d is formed so as to be larger than the spacing $l_1$.

Figure 22:
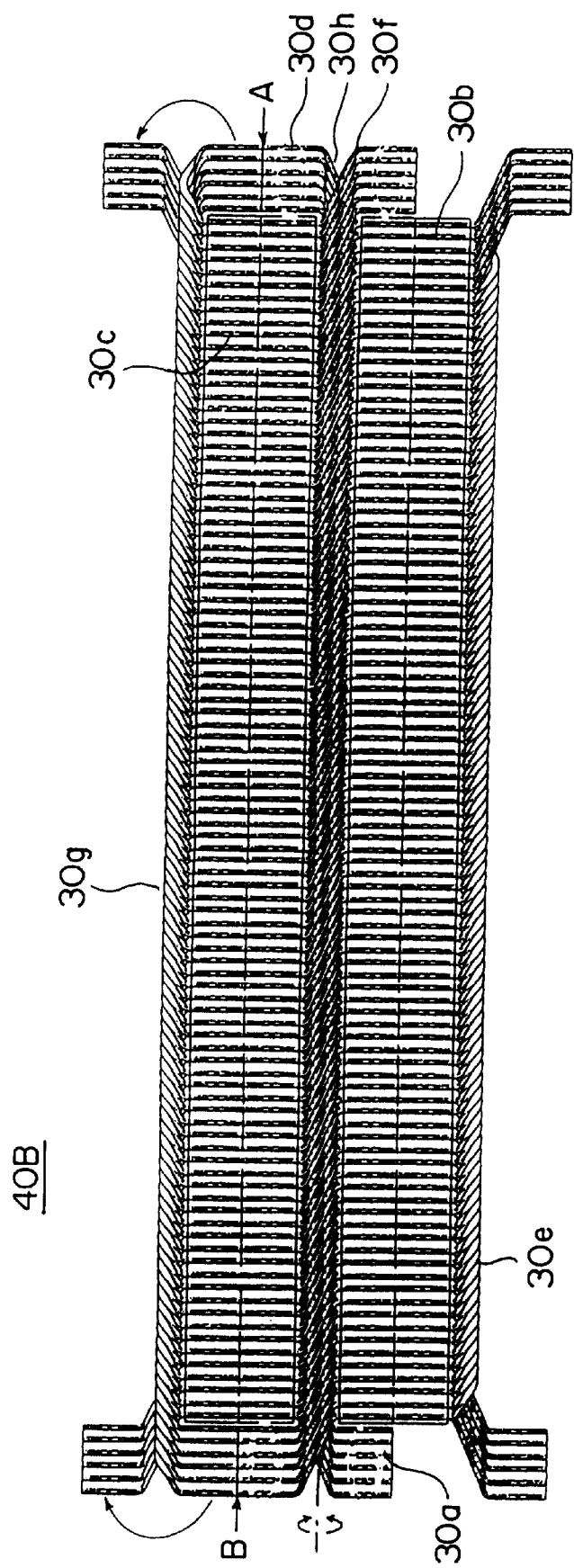
FIG. 22 is a diagram explaining the winding assembly forming process in the method of manufacture for the stator of the alternator according to Embodiment 3 of the present invention.

Then, as indicated by arrows in FIGS. 20 and 21, a flattened cylindrical body 40B is formed in which the second and third straight portions 30b and 30c which are linked by the second inclined portions 30f and the fourth and first straight portions 30d and 30a which are linked by the fourth inclined portions 30h are wound helically so as to alternately occupy a first plane and a second plane by folding back the first and third inclined portions 30e and 30g in the same direction at central portions thereof. As shown in FIG. 22, this cylindrical body 40B is constructed by arranging the second and third straight portions 30b and 30c, which are linked by the second inclined portions 30f, at a pitch of one slot in the first plane, and arranging the fourth and first straight portions 30d and 30a, which are linked by the fourth inclined portions 30h, at a pitch of one slot in the second plane.

Then, as shown in FIG. 22, terminal processing is performed by cutting six of the third straight portions 30d at central portions A at a first end portion of the cylindrical body 40B, and cutting six of the second straight portions 30c at central portions B at a second end portion of the cylindrical body 40 to form connecting portions with other end portions of the strands of wire 30.

Figure 23:
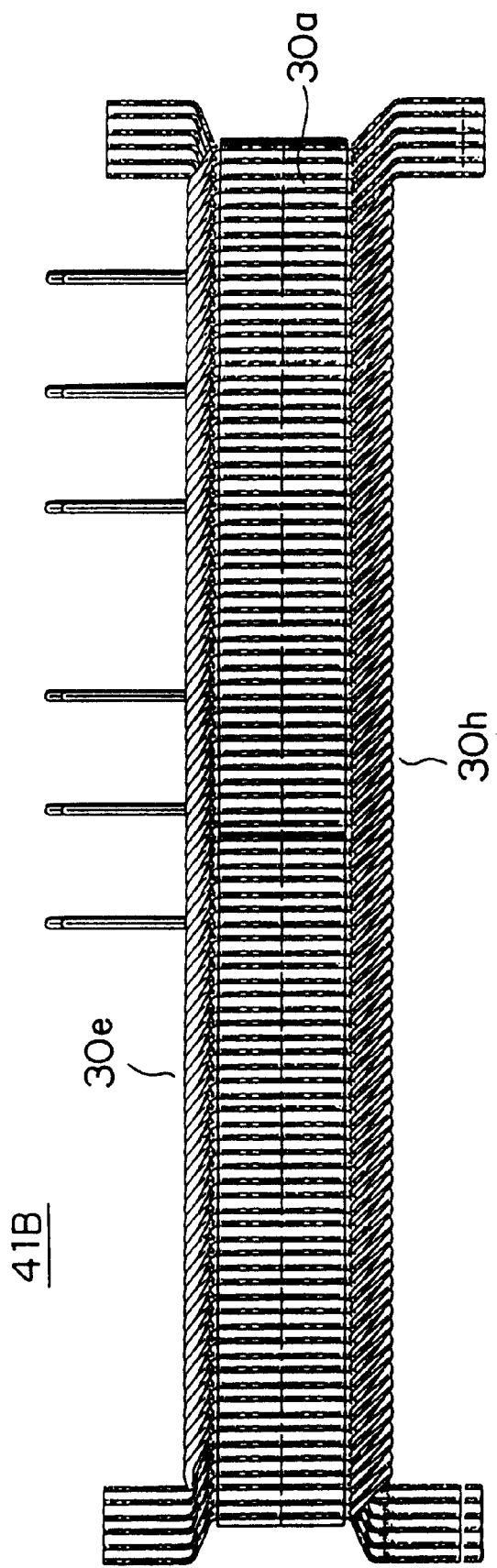
FIG. 23 is a plan showing the winding assembly used in the stator of the alternator according to Embodiment 3 of the present invention.

Thereafter, a winding assembly 41B, shown in FIG. 23, is prepared by folding over the cylindrical body 40B at central portions of the second inclined portions 30f and the fourth inclined portions 30h which are disposed at a pitch of one slot, such that the second straight portions 30b and the third straight portions 30c face each other, as indicated by arrows in FIG. 22.

In this winding assembly 41B, the first to fourth straight portions 30a to 30d are disposed at a pitch p so as to be lined up in four layers at a pitch w equal to the width of the strands of wire 30 in the width direction of the strands of wire 30, on a first side of which the folded first inclined portions 30e, which function as first turn portions, and the folded third inclined portions 30g, which function as third turn portions, are disposed at a pitch of one slot in the direction of disposal of the straight portions to form two rows. On a second side, the folded second inclined portions 30f, which function as second turn portions, and the folded fourth inclined portions 30h, which function as fourth turn portions, are disposed at a pitch of one slot in the direction of disposal of the straight portions to form two layers.

Here, lead portions of the output wires and the neutral points extend outwards from the second and third inclined portions 30e and 30g of the winding assembly 41B, and these lead portions are formed by drawing out specific strands of wire 30 during the process of folding and bending the strands of wire 30 into the lightning-bolt shape.

As shown in FIG. 12A, insulators 19 are mounted in slots 42a of a laminated core 42, and the first to fourth straight portions 30a to 30d of the winding assembly 41B are inserted so as to stack up within each of the slots 42a. Thus, the winding assembly 41B is installed in the laminated core 42 as shown in FIG. 12B.

Next, the laminated core 42 is rolled up and its ends abutted and welded to each other to obtain the cylindrical stator core 15, as shown in FIG. 12C.

Then, end portions of the same strand of wire 30 are connected so that first and second winding sub-portions 31 and 32 which are wound into slot groups disposed at a pitch of six slots each form lap windings having two turns per lap. Then, the two three-phase alternating-current windings are obtained by cutting each of the lead portions of the winding assembly 41B, forming crossover connections, then connecting the neutral points.

Thus, the stator 8B obtained is formed by installing the stator winding 16B composed of the two three-phase alternating-current windings in the stator core 15.

Thus, in Embodiment 3, because the winding assembly 41B is formed by arranging the twelve strands of wire 30 in the same plane at a pitch of one slot, folding and bending the twelve strands of wire 30 to form the lightning-bolt shaped pattern shown in FIGS. 20 and 21, forming the cylindrical body 40B in which the second and third straight portions 30b and 30c which are linked by the second inclined portions 30f and the fourth and first straight portions 30d and 30a which are linked by the fourth inclined portions 30h are wound helically by folding back the first and third inclined portions 30e and 30g in the same direction at central portions thereof, and then folding the cylindrical body 40B, over at central portions of the second and fourth inclined portions 30f and 30h, a winding assembly can be easily manufactured which alternately occupies an inner layer and an outer layer in a slot depth direction in every sixth slot 15a and constitutes a lap winding having two turns per lap.

Because the winding assembly 41B prepared in this manner is used, six stator winding phase portions 161B can be installed into the stator core 15 by installing one winding assembly 41B into the stator core 15. Thus, the complex operation of inserting a large number of segments into the slots of the stator core and joining the end portions thereof together one by one is no longer required, significantly improving assembly and workability, thereby enabling producibility to be increased. In addition, cases in which the number of turns in the stator winding is increased can easily be adapted for by stacking and installing a plurality of the winding assemblies 41B into the stator core 15.

Because the coil ends are constituted by the turn portions of the strands of wire 30, the number of joints in the coil end groups 16f and 16r is significantly reduced. Thus, there is no need to extend the coil ends out by an extra amount from the end surfaces of th e stator core 15, enabling the stator 8B to be reduced in size. In addition, because the occurrence of short-circuiting accidents which accompany loss of insulation due to the joining process can be suppressed, superior insulation can be obtained and high yield can also be achieved. In addition, reductions in resistance to corrosion which accompany loss of insulation due to joining can be suppressed.

Embodiment 4

Figure 24:
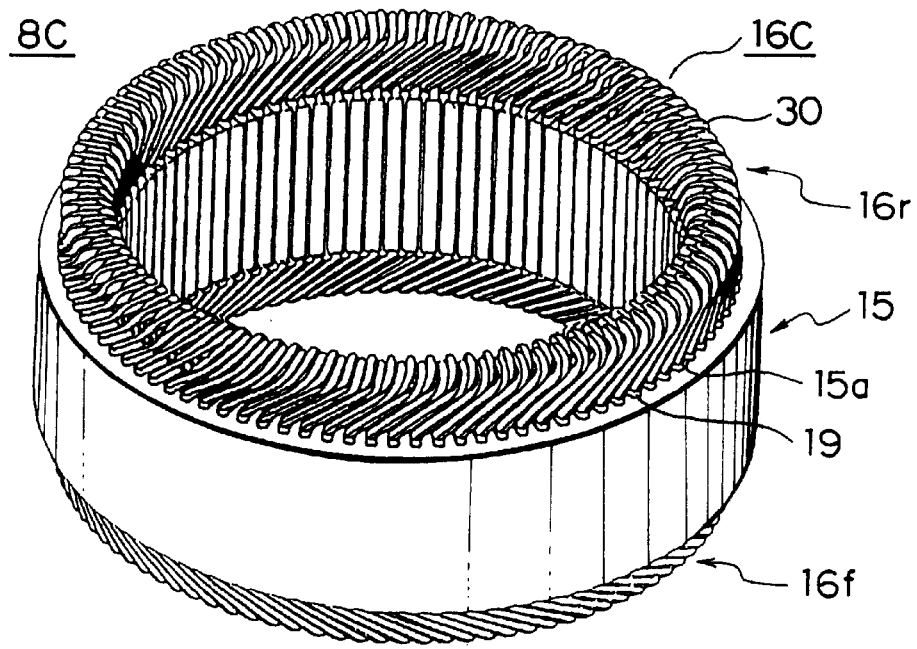
FIG. 24 is a perspective showing a stator of the alternator according to Embodiment 4 of the present invention viewed from the rear end.
Figure 25:
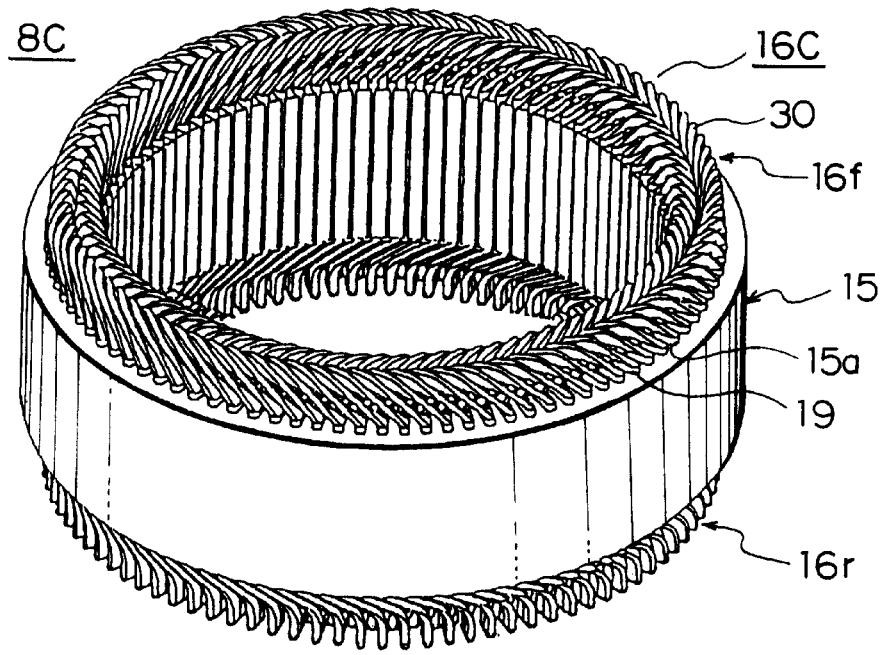
FIG. 25 is a perspective showing the stator of the alternator according to Embodiment 4 of the present invention viewed from the front end.
Figure 26:
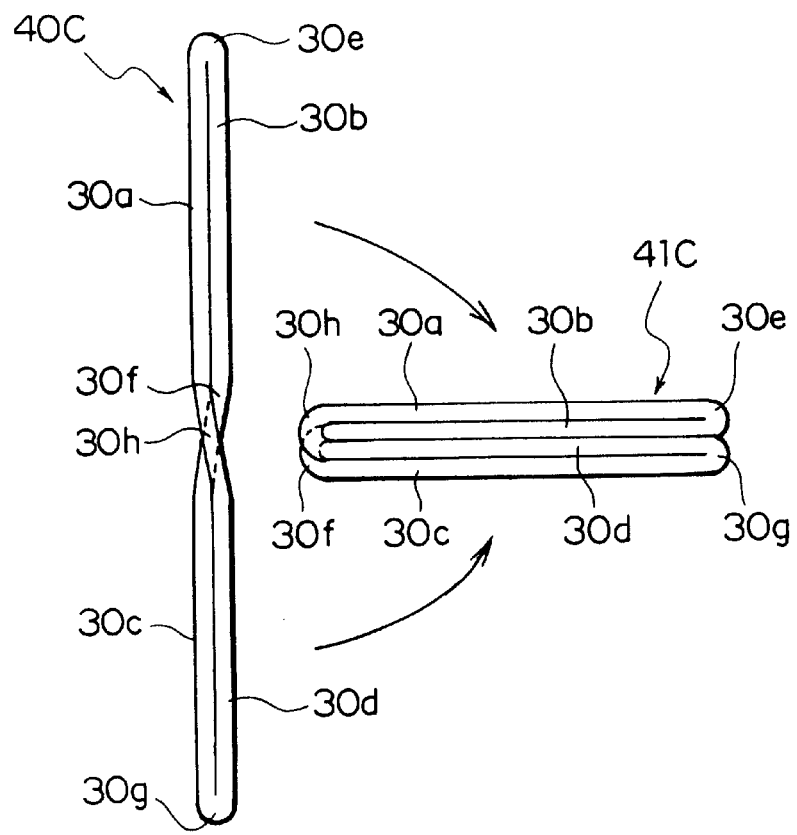
FIG. 26 is a diagram explaining a winding assembly forming process in a method of manufacture for the stator of the alternator according to Embodiment 4 of the present invention.
Figure 27:
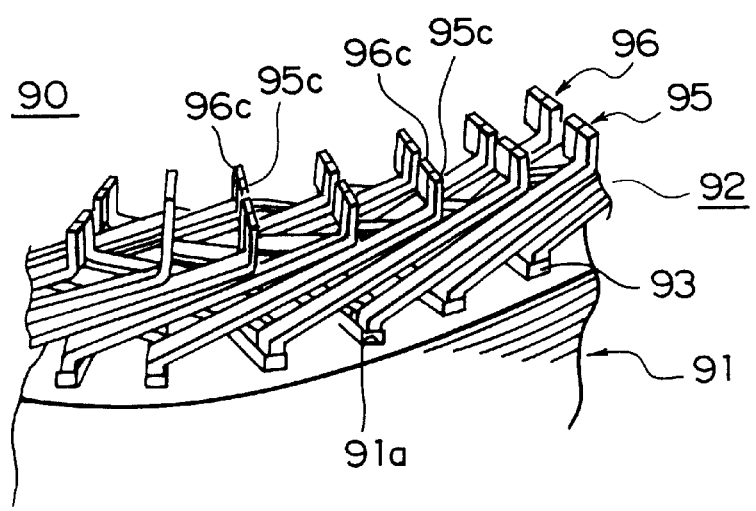
FIG. 27 is a perspective of part of a stator winding of a conventional alternator viewed from the front end.
Figure 28:
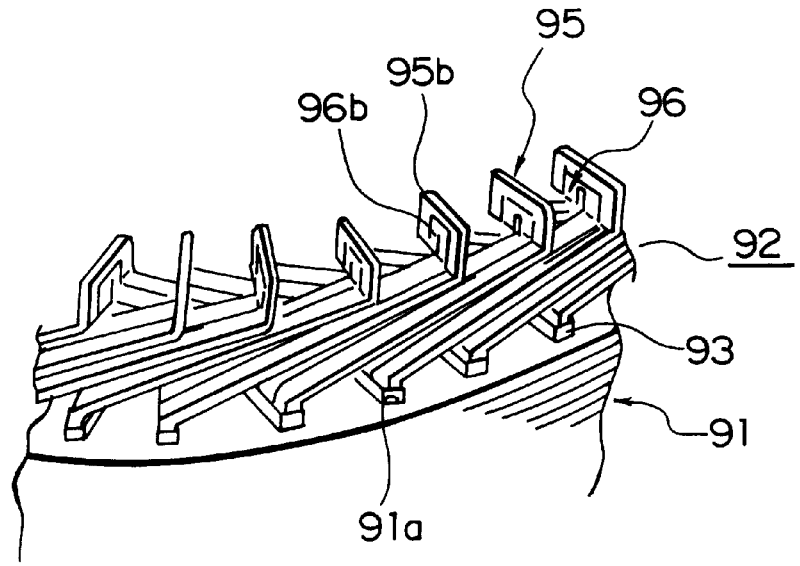
FIG. 28 is a perspective of part of the stator winding of the conventional alternator viewed from the rear end.
Figure 29:
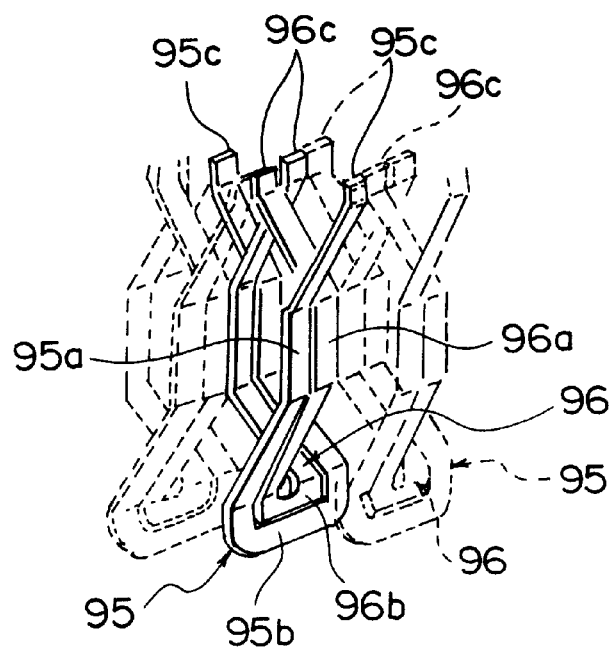
FIG. 29 is a perspective showing a construction of a conductor segment used in the stator winding of the conventional alternator.

FIGS. 24 and 25 are perspectives showing a stator of the alternator according to Embodiment 4 of the present invention viewed from the rear end and the front end, respectively, and FIG. 26 is a diagram explaining a winding assembly forming process in a method of manufacture for the stator of the alternator according to Embodiment 4 of the present invention. In FIGS. 24 and 25, neutral points and output wires have been omitted.

In this stator 8C, four strands of wire 30 are housed so as to line up in a slot depth direction within the slots 15a as shown in FIGS. 24 and 25.

Then, in pairs of first and second slots, in which the slots forming each pair are six slots apart, the strand of wire 30 housed in the first address of the first slot 15a is folded back outside the slots at the front end of the stator core 15 and housed in the second address of the second slot 15a, and the strand of wire 30 housed in the fourth address of the first slot 15a is folded back outside the slots at the front end of the stator core 15 and housed in the third address of the second slot 15a.

Furthermore, in the pairs of first and second slots in which the slots forming each pair are six slots apart, the strand of wire 30 housed in the fourth address of the first slot 15a is folded back outside the slots at the rear end of stator core 15 and housed in the second address of the second slot 15a, and the strand of wire 30 housed in the third address of the first slot 15a is folded over outside the slots at the rear end of the stator core 15 and housed in the first address of the second slot 15a.

Thus, the stator winding 16C is constituted by a plurality of winding sub-portions in each of which a single strand of wire 30 is wound into a lap winding having two turns per lap so as to alternately occupy an inner layer and an outer layer in a slot depth direction in every sixth slot 15a. Turn portions of the strands of wire 30 folded over outside the slots at the front end of the stator core 15 are disposed in a circumferential direction so as to form two rows in a radial direction and constitute a front-end coil end group 16f, and turn portions of the strands of wire 30 folded over outside the slots at the rear end of the stator core 15 are disposed in a circumferential direction so as to form one row in a radial direction and constitute a rear-end coil end group 16r. The winding assembly 41C, formed by integrating a plurality of the winding sub-portions, is formed by folding back the cylindrical body 40C, in which the first to fourth straight portions 30a to 30d are wound helically, at central portions of the second and fourth inclined portions 30f and 30h as shown in FIG. 26.

Moreover, the rest of the construction is constructed similarly to the above embodiments.

Consequently, the same effects as in each of the above embodiments can also be obtained in Embodiment 4.

Furthermore, because turn portions of the strands of wire 30 in Embodiment 4 are disposed in a circumferential direction so as to form two rows in a radial direction and constitute the front-end coil end group 16f, and turn portions of the strands of wire 30 are disposed so as to form one row in a circumferential direction and constitute the rear-end coil end group 16r, the axial heights of the front-end and rear end-end groups 16f and 16r can be reduced. Thus, coil leakage reactance is further reduced, improving output, and wind resistance is reduced, alleviating wind noise, compared to each of the above embodiments.

In each of the above embodiments, the number of slots in the stator was ninety-six slots for sixteen magnetic poles, but three phases and seventy-two slots for twelve magnetic poles, 120 slots for twenty poles, etc., may also be adopted. Furthermore, in the case of one slot per pole per phase, there may also be forty-eight slots for sixteen poles, thirty-six slots for twelve poles, sixty slots for twenty poles, etc.

In such cases, if x is the number of slots per pole per phase and y is the number of winding phase portions, then the number of strands of wire constituting the stator winding is given by 2xy, the first to fourth straight portions constituting the winding assembly will each be disposed at a pitch of 2xyp, and the amount of offset between the first straight portions and second straight portions in the direction of disposel is given by xyp.

Each of the above embodiments has been explained for four turns, but when even lower-speed output is required eight turns may be used. That case can also be adapted to simply by inserting two winding assemblies 41 (41B) into the stator core 15 so as to line up radially. Furthermore, six turns can be adapted to simply by inserting one winding assembly 41 (41B) and one winding assembly shown in the comparative example above into the stator core 15 so as to line up radially.

The present invention is constructed in the above manner and exhibits the effects described below.

According to one aspect of the present invention, there is provided an alternator including:

a stator having a cylindrical stator core formed with a plurality of slots extending axially at a predetermined pitch in a circumferential direction, and a stator winding installed into the stator core; and a rotor for forming north-seeking (N) and south-seeking (S) poles about a rotational circumference, the rotor being disposed on an inner circumferential side of the stator core, wherein the stator winding comprises a plurality of winding sub-portions in each of which a strand of wire formed from a continuous wire is wound so as to alternately occupy an inner layer and an outer layer in a slot depth direction within the slots at intervals of a predetermined number of slots by folding over the strand of wire outside the slots at end surfaces of the stator core and form a lap winding having two turns in each lap. Thus, because the number of crossover connections is reduced and the connecting portions are simplified, an alternator is provided in which axial height of the coil ends can be lowered, the number of weld portions on the coil ends can be decreased, deterioration in output, wind noise and magnetic noise can be suppressed, and cooling is also improved.

Four of the strands of wire constituting the winding sub-portions may be housed so as to line up in each of the slots so as to occupy a first layer, a second layer, a third layer, and a fourth layer in a slot depth direction;

turn portions formed by folding the strands of wire over outside the slots at a first end surface of the stator core may be disposed circumferentially to form two rows in a radial direction; and turn portions formed by folding the strands of wire over outside the slots at a second end surface of the stator core may be disposed circumferentially to form two layers in an axial direction, reducing axial height of the coil end at a first end of the stator core, thereby increasing output and reducing wind noise.

In each of slot pairs in which first and second slots forming each of the slot pairs are a predetermined number of slots apart:

the strand of wire housed in the first layer inside the first slot may be folded over outside the slots at the first end surface of the stator core and housed in the second layer inside the second slot;

the strand of wire housed in the third layer of the first slot may be folded over outside the slots at the first end surface of the stator core and housed in the fourth layer of the second slot;

the strand of wire housed in the third layer inside the first slot may be folded over outside the slots at the second end surface of the stator core and housed in the second layer inside the second slot; and the strand of wire housed in the fourth layer of the first slot may be folded over outside the slots at the second end surface of the stator core and housed in the first layer of the second slot, enabling a stator winding to be achieved by a simple construction.

The strands of wire may be installed two at a time into slot sets constituted by slot groups disposed a predetermined number of slots apart, the two strands of wire installed in each of the slot sets constituting a first strand of wire and a second strand of wire, and the stator winding may be composed of a plurality of stator winding phase portions, each of the stator winding phase portions comprising:

a first winding sub-portion constructed by joining first and second end portions of the first strand of wire extending outwards outside the slots at the second end surface of the stator core from the fourth layer in the first slot of a first pair and the first layer in the second slot of the first pair, the first pair being one pair of the slot pairs constituting each of the slot sets; and a second winding sub-portion constructed by joining first and second end portions of the second strand of wire extending outwards outside the slots at the second end surface of the stator core from the third layer in the first slot of the first pair and the second layer in the second slot of the first pair, wherein each of the stator winding phase portions is constructed by connecting the first and second, winding sub-portions in series by crossover connecting the first strand of wire extending outwards outside the slots at the second end surface of the stator core from the fourth layer in the first slot of a second pair, and the second strand of wire extending outwards from the outside of the slots at the second end surface of the stator core from the second layer in the second slot of the second pair, the second pair being another pair of the slot pairs constituting each of the slot sets, and wherein the second strand of wire extending outwards at the second end surface of the stator core from the third layer in the first slot of the second pair, and the first strand of wire extending outwards at the second end surface of the stator core from the first layer in the second slot of the second pair constitute a neutral point and an output wire of the stator winding phase portion, respectively, making the number of crossover connections per stator winding phase portion one, thereby improving the connecting operation. Furthermore, circumferential irregularities in the coil end groups resulting from the crossover connections are reduced, thereby improving the cooling effect.

The strands of wire may be installed two at a time into slot sets constituted by slot groups disposed a predetermined number of slots apart, the two strands of wire installed in each of the slot sets constituting a first strand of wire and a second strand of wire, and the stator winding may be composed of a plurality of stator winding phase portions, each of the stator winding phase portions being constructed by a first and second winding sub-portions which are connected in series by joining a first end portion of the first strand of wire extending outwards outside the slots at the second end surface of the stator core from the fourth layer in the first slot of a first pair to a second end portion of the second strand of wire extending outwards outside the slots at the second end surface of the stator core from the second layer in the second slot of the first pair, and joining a first end portion of the second strand of wire extending outwards outside the slots at the second end surface of the stator core from the third layer in the first slot of the first pair to a second end portion of the first strand of wire extending outwards outside the slots at the second end surface of the stator core from the first layer in the second slot of the second pair, the first pair being one pair of the slots pair constituting each of the slot sets, wherein the second strand of wire extending outwards at the first end surface of the stator core from the third layer in the first slot of a second pair and from the fourth layer in the second slot of the second pair is cut to constitute a neutral point and an output wire of the stator winding phase portion, the second pair being another pair of the slot pairs constituting each of the slot sets, eliminating crossover connections in one stator winding phase portion, thereby improving the connecting operation. Furthermore, circumferential irregularities in the coil end groups resulting from the crossover connections are reduced, enabling worsening of wind noise to be further suppressed and wind resistance to be reduced, thereby further improving the cooling effect.

In each of slot pairs in which first and second slots forming each of the slot pairs are a predetermined number of slots apart:

the strand of wire housed in the second layer inside the first slot may be folded over outside the slots at the first end surface of the stator core and housed in the first layer inside the second slot;

the strand of wire housed in the third layer of the first slot may be folded over outside the slots at the first end surface of the stator core and housed in the fourth layer of the second slot;

the strand of wire housed in the second layer inside the first slot may be folded over outside the slots at the second end surface of the stator core and housed in the third layer inside the second slot; and the strand of wire housed in the fourth layer of the first slot may be folded over outside the slots at the second end surface of the stator core and housed in the first layer of the second slot, enabling a stator winding to be achieved a simple construction.

The strands of wire may be installed two at a time into slot sets constituted by slot groups disposed a predetermined number of slots apart, the two strands of wire installed in each of the slot sets constituting a first strand of wire and a second strand of wire, and the stator winding may be composed of a plurality of stator winding phase portions, each of the stator winding phase portions comprising:

a first winding sub-portion constructed by joining first and second end portions of the first strand of wire extending outwards outside the slots at the second end surface of the stator core from the fourth layer in the first slot of a first pair and the first layer in the second slot of the first pair, the first pair being one pair of the slot pairs constituting each of the slot sets; and a second winding sub-portion constructed by joining first and second end portions of the second strand of wire extending outwards outside the slots at the second end surface of the stator core from the second layer in the first slot of the first pair and the third layer in the second slot of the first pair, wherein each of the stator winding phase portions is constructed by connecting the first and second sub-portions in series by crossover connecting the second strand of wire extending outwards outside the slots at the first end surface of the stator core from the third layer in the first slot of a second pair, and the first strand of wire extending outwards from the outside of the slots at the first end surface of the stator core from the first layer in the second slot of the second pair, the second pair being another pair of the slot pairs constituting each of the slot sets, and wherein the first strand of wire extending outwards at the first end surface of the stator core from the second layer in the first slot of the second pair, and the second strand of wire extending outwards at the first end surface of the stator core from the fourth layer in the second slot of the second pair constitute a neutral point and an output wire of the stator winding phase portion, respectively, making the number of crossover connections per stator winding phase portion one, thereby improving the connecting operation. Furthermore, circumferential irregularities in the coil end groups resulting from the crossover connections are reduced, enabling worsening of wind noise to be suppressed and wind resistance to be reduced, thereby improving the cooling effect.

Four of the strands of wire constituting the winding sub-portions may be housed so as to line up in each of the slots so as to occupy a first layer, a second layer, a third layer, and a fourth layer in a slot depth direction;

turn portions formed by folding the strands of wire over outside the slots at a first end surface of the stator core may be disposed circumferentially to form two rows in a radial direction; and turn portions formed by folding the strands of wire over outside the slots at a second end surface of the stator core may be disposed in one row circumferentially, reducing axial height of the coil ends at first and second ends of the stator core, thereby increasing output and educing wind noise.

According to another aspect of the present invention, there is a winding assembly for an alternator, the winding assembly including a winding group composed of 2n winding sub-portions disposed at a pitch of p, each of the winding sub-portions being constructed by folding and bending one strand of wire formed from a continuous wire into a pattern, the pattern having:

first straight portions disposed at a pitch of 2np;

second straight portions disposed at the pitch of 2np being offset by an amount w to a first side in a width direction from the first straight portions and offset by an amount np forwards relative to a direction of disposal of the first straight portions;

third straight portions disposed at the pitch of 2np being offset by the amount w to the first side in the width direction from the second portions and offset by the amount np backwards relative to the direction of disposal of the second straight portions;

fourth straight portions disposed at the pitch of 2np being offset by the amount w to the first side in the width direction from the third straight portions and offset by the amount np forwards relative to the direction of disposal of the third straight portions;

first turn portions linking first ends of the first straight portions to first ends of the second straight portions offset by the amount np forwards relative to the direction of disposal of the first straight portions;

second turn portions linking second ends of the second straight portions to second ends of the third straight portions offset by the amount np backwards relative to the direction of disposal of the second straight portions;

third turn portions linking first ends of the third straight portions to first ends of the fourth straight portions offset by the amount np forwards relative to the direction of disposal of the third straight portions; and fourth turn portions linking second ends of the fourth straight portions to second ends of the first straight portions offset by the amount np forwards relative to the direction of disposal of the fourth straight portions, wherein the winding sub-portions are disposed parallel to each other at the pitch of p in the direction of disposal such that the first to fourth straight portions form four layers in the width direction, the first turn portions are disposed parallel to each other at the pitch of p and the third turn portions are disposed parallel to each other at the pitch of p such that the first turn portions and the third turn portions form two rows in the direction of disposal, and the second turn portions are disposed parallel to each other at the pitch of p and the fourth turn portions are disposed parallel to each other at the pitch of p such that the second turn portions and the fourth turn portions form two layers in a longitudinal direction of the straight portions, thereby providing a wind assembly enabling the achievement of a stator winding with superior mass-producibility which can be made more compact.

According to another aspect of the present invention, there is a winding assembly for an alternator, the winding assembly comprising a winding group composed of 2n winding sub-portions disposed at a pitch of p, each of the winding sub-portions being constructed by folding and bending one strand of wire formed from a continuous wire into a pattern, the pattern having:

first straight portions disposed at a pitch of 2np;

second straight portions disposed at the pitch of 2np being offset by an amount w to a first side in a width direction from the first straight portions and offset by an amount np forwards relative to a direction of disposal of the first straight portions;

third straight portions disposed at the pitch of 2np being offset by the amount w to the first side in the width direction from the second portions and offset by the amount np forwards relative to the direction of disposal of the second straight portions;

fourth straight portions disposed at the pitch of 2np being offset by the amount w to the first side in the width direction from the third straight portions and offset by the amount np backwards relative to the direction of disposal of the third straight portions;

first turn portions linking first ends of the first straight portions to first ends of the second straight portions offset by the amount np forwards relative to the direction of disposal of the first straight portions;

second turn portions linking second ends of the second straight portions to second ends of the third straight portions offset by the amount np forwards relative to the direction of disposal of the second straight portions;

third turn portions linking first ends of the third straight portions to first ends of the fourth straight portions offset by the amount np backwards relative to the direction of disposal of the third straight portions; and fourth turn portions linking second ends of the fourth straight portions to second ends of the first straight portions offset by the amount np forwards relative to the direction of disposal of the fourth straight portions, wherein the winding sub-portions are disposed parallel to each other at the pitch of p in the direction of disposal such that the first to fourth straight portions form four layers in the width direction, the first turn portions are disposed parallel to each other at the pitch of p and the third turn portions are disposed parallel to each other at the pitch of p such that the first turn portions and the third turn portions form two rows in the direction of disposal, and the second turn portions are disposed parallel to each other at the pitch of p and the fourth turn portions are disposed parallel to each other at the pitch of p such that the second turn portions and the fourth turn portions form two layers in a longitudinal direction of the straight portions, thereby providing a winding assembly enabling the achievement of a stator winding with superior mass-producibility which can be made more compact.

According to another aspect of the present invention, there is a method of manufacture for a winding assembly for an alternator, the method including steps of:

disposing a group of 2n straight strands of wire at a pitch p in a first plane;

forming a lightning-bolt shaped pattern composed of a plurality of basic patterns by folding and bending the group of strands of wire in the plane, each of the basic patterns comprising:
  first straight portions having a length $l_0$;
  second straight portions having the length $l_0$ being linked to the first straight portions by first inclined portions having a length $l_1$, the second straight portions being offset by an amount np to a first side in a direction of disposal of the strands of wire relative to the first straight portions;
  third straight portions having the length $l_0$ being linked to the second straight portions by second inclined portions having the length $l_1$, the third straight portions being offset by the amount np to a second side in a direction of disposal of the strands of wire relative to the second straight portions; and
  fourth straight portions having the length $l_0$ being linked to the third straight portions by third inclined portions having the length $l_1$, the fourth straight portions being offset by the amount np to the first side in a direction of disposal of the strands of wire relative to the third straight portions,
  wherein the lightning-bolt shaped pattern is constructed by repeating the basic pattern a predetermined number of times by offsetting the basic pattern to the first side in the direction of disposal of the strands of wire by fourth inclined portions having a length $l_2$, the length $l_2$ being greater than the length $l_1$;
forming a flattened cylindrical body by folding over the group of strands of wire formed into the lightning-bolt shaped pattern in a first direction at central portions of the first and the third inclined portions, the cylindrical body being constructed by helically winding the group of strands of wire such that the second and third straight portions linked by the second inclined portions and the first and fourth straight portions linked by the fourth inclined portions alternately occupy the first plane and a second plane; and
forming a winding group by folding over the cylindrical body at central portions of the second and the fourth inclined portions in a second direction such that the second and the third straight portions face each other, wherein
  the first to fourth straight portion s are disposed parallel to each other at the pitch of p in the direction of disposal such that the first to fourth straight portions form four layers in the width direction,
  first turn portions formed by folding over the group of strands of wire at the first inclined portions are disposed parallel to each other at the pitch of p and third turn portions formed by folding over the group of strands of wire at the third inclined portions are disposed parallel to each other at the pitch of p such that the first turn portions and the third turn portions form two rows in the direction of disposal, and
  second turn portions of the strands of wire formed by folding over the cylindrical body at the second inclined portions are disposed parallel to each other at the pitch of p and the fourth turn portions of the strands of wire formed by folding over the cylindrical body at the fourth inclined portions are disposed parallel to each other at the pitch of p such that the second turn portions and the fourth turn portions form two layers in a longitudinal direction of the straight portions, thereby providing a method of manufacture for a winding assembly in which a winding assembly enabling the achievement of a stator winding which can be made more compact can be manufactured with superior mass-producibility.

According to another aspect of the present invention, there is a method of manufacture for a winding assembly for an alternator, the method including steps of:
  disposing a group of 2n straight strands of wire at a pitch p in a first plane;
  forming a lightning-bolt shaped pattern composed of a plurality of basic patterns by folding and bending the group of strands of wire in the plane, each of the basic patterns comprising:
    first straight portions having a length $l_0$;
    second straight portions having the length $l_0$ being linked to the first straight portions by first inclined portions having a length $l_1$, the second straight portions being offset by an amount np to a first side in a direction of disposal of the strands of wire relative to the first straight portions;
    third straight portions having the length $l_0$ being linked to the second straight portions by second inclined portions having the length $l_1$, the third straight portions being offset by the amount np to the first side in a direction of disposal of the strands of wire relative to the second straight portions; and
    fourth straight portions having the length $l_0$ being linked to the third straight portions by third inclined portions having the length $l_1$, the fourth straight portions being offset by the amount np to a second side in a direction of disposal of the strands of wire relative to the third straight portions,
    wherein the lightning-bolt shaped pattern is constructed by repeating the basic pattern a predetermined number of times by offsetting the basic pattern to the first side in the direction of disposal of the strands of wire by fourth inclined portions having a length $l_2$, the length $l_2$ being greater than the length $l_1$;
  forming a flattened cylindrical body by folding over the group of strands of wire formed into the lightning-bolt shaped pattern in a first direction at central portions of the first and the third inclined portions, the cylindrical body being constructed by helically winding the group of strands of wire such that the second and third straight portions linked by the second inclined portions and the first and fourth straight portions linked by the fourth inclined portions alternately occupy the first plane and a second plane; and
  forming a winding group by folding over the cylindrical body at central portions of the second and the fourth inclined portions in a second direction such that the second and the third straight portions face each other, wherein
    the first to fourth straight portions are disposed parallel to each other at the pitch of p in the direction of disposal such that the first to fourth straight portions form four layers in the width direction,
    first turn portions formed by folding over the group of strands of wire at the first inclined portions are disposed parallel to each other at the pitch of p and third turn portions formed by folding over the group of strands of wire at the third inclined portions are disposed parallel to each other at the pitch of p such that the first turn portions and the third turn portions form two rows in the direction of disposal, and
    second turn portions of the strands of wire formed by folding over the cylindrical body at the second inclined portions are disposed parallel to each other at the pitch of p and the fourth turn portions of the strands of wire formed by folding over the cylindrical body at the fourth inclined portions are disposed parallel to each other at the pitch of p such that the second turn portions and the fourth turn portions form two layers in a longitudinal direction of the straight portions, thereby providing a method of manufacture for a winding assembly in which a winding assembly enabling the achievement of a stator winding which can be made more compact can be manufactured with superior mass-producibility.

What is claimed is:

1. An alternator comprising:
   a stator having a cylindrical stator core formed with a plurality of slots extending axially at a predetermined pitch in a circumferential direction, and a stator winding installed into said stator core; and
   a rotor for forming north-seeking (N) and south-seeking (S) poles about a rotational circumference, said rotor being disposed on an inner circumferential side of said stator core, wherein
      said stator winding comprises a plurality of winding sub-portions in each of which a strand of wire formed from a continuous wire is wound so as to occupy in rotation an innermost layer through an outermost layer in a slot depth direction within said slots at intervals of a predetermined number of slots by folding over said strand of wire outside said slots at end surfaces of said stator core and form a lap winding having two turns in each lap, and wherein four of said strands of wire constituting said winding sub-portions are housed so as to line up in each of said slots so as to occupy a first layer, a second layer, a third layer, and a fourth layer in a slot depth direction;
      first turn portions formed by folding said strands of wire over outside said slots at a first end surface of said stator core are disposed circumferentially to form two rows in a radial direction; and
      second turn portions formed by folding said strands of wire over outside said slots at a second end surface of said stator core are disposed circumferentially to form two layers in an axial direction and one row in a radial direction.

2. The alternator according to claim 1 wherein, in each of slot pairs in which first and second slots forming each of said slot pairs are a predetermined number of slots apart:
   said strand of wire housed in said first layer inside said first slot is folded over outside said slots at said first end surface of said stator core and housed in said second layer inside said second slot;
   said strand of wire housed in said third layer of said first slot is folded over outside said slots at said first end surface of said stator core and housed in said fourth layer of said second slot;
   said strand of wire housed in said third layer inside said first slot is folded over outside said slots at said second end surface of said stator core and housed in said second layer inside said second slot; and
   said strand of wire housed in said fourth layer of said first slot is folded over outside said slots at said second end surface of said stator core and housed in said first layer of said second slot.

3. A The alternator according to claim 2 wherein said strands of wire are installed two at a time into slot sets constituted by slot groups disposed a predetermined number of slots apart, said two strands of wire installed in each of said slot sets constituting a first strand of wire and a second strand of wire, and
   said stator winding is composed of a plurality of stator winding phase portions, each of said stator winding phase portions comprising:
      a first winding sub-portion constructed by joining first and second end portions of said first strand of wire extending outwards outside said slots at said second end surface of said stator core from said fourth layer in said first slot of a first pair and said first layer in said second slot of said first pair, said first pair being one pair of said slot pairs constituting each of said slot sets; and
      a second winding sub-portion constructed by joining first and second end portions of said second strand of wire extending outwards outside said slots at said second end surface of said stator core from said third layer in said first slot of said first pair and said second layer in said second slot of said first pair,
   wherein each of said stator winding phase portions is constructed by connecting said first and second winding sub-portions in series by crossover connecting said first standoff wire extending outwards outside said slots at said second end surface of said stator core from said fourth layer in said first slot of a second pair, and said second strand of wire extending outwards from the outside of the slots at said second end surface of said stator core from said second layer in said second slot of said second pair, said second pair being another pair of said slot pairs constituting each of said slot sets, and
   wherein said second strand of wire extending outwards at said second end surface of said stator core from said third layer in said first slot of said second pair, and said first strand of wire extending outwards at said second end surface of said stator core from said first layer in said second slot of said second pair constitute a neutral point and an output wire of said stator winding phase portion, respectively.

4. The alternator according to claim 2 wherein said strands of wire are installed two at a time into slot sets constituted by slot groups disposed a predetermined number of slots apart, said two strands of wire installed in each of said slot sets constituting a first strand 6f wire and a second strand of wire, and
   said stator winding is composed of a plurality of stator winding phase portions, each of said stator winding phase portions being constructed by a first and second winding sub-portions which are connected in series by joining a first end portion of said first strand of wire extending outwards outside said slots at said second end surface of said stator core from said fourth layer in said first slot of a first pair to a second end portion of said second strand of wire extending outwards outside said slots at said second end surface of said stator core from said second layer in said second slot of said first pair, and joining a first end portion of said second strand of wire extending outwards outside said slots at said second end surface of said stator core from said third layer in said first slot of said first pair to a second end portion of said first strand of wire extending outwards outside said slots at said second end surface of said stator core from said first layer in said second slot of said second pair, said first pair being one pair of said slots pair constituting each of said slot sets,
   wherein said second strand of wire extending outwards at said first end surface of said stator core from said third layer in said first slot of a second pair and from said fourth layer in said second slot of said second pair is cut to constitute a neutral point and an output wire of said stator winding phase portion, said second pair being another pair of said slot pairs constituting each of said slot sets.

5. The alternator according to claim 1 wherein, in each of slot pairs in which first and second slots forming each of said slot pairs are a predetermined number of slots apart:

said strand of wire housed in said second layer inside said first slot is folded over outside said slots at said first end surface of said stator core and housed in said first layer inside said second slot;

said strand of wire housed in said third layer of said first slot is folded over outside said slots at said first end surface of said stator core and housed in said fourth layer of said second slot;

said strand of wire housed in said second layer inside said first slot is folded over outside said slots at said second end surface of said stator core and housed in said third layer inside said second slot; and said strand of wire housed in said fourth layer of said first slot is folded over outside said slots at said second end surface of said stator core and housed in said first layer of said second slot.

6. The alternator according to claim 5 wherein said strands of wire are installed two at a time into slot sets constituted by slot groups disposed a predetermined number of slots apart, said two strands of wire installed in each of said slot sets constituting a first strand of wire and a second strand of wire, and said stator winding is composed of a plurality of stator winding phase portions, each of said stator winding phase portions comprising:

a first winding sub-portion constructed by joining first and second end portions of said first strand of wire extending outwards outside said slots at said second end surface of said stator core from said fourth layer in said first slot of a first pair and said first layer in said second slot of said first pair, said first pair being one pair of said slot pairs constituting each of said slot sets; and a second winding sub-portion constructed by joining first and second end portions of said second strand of wire extending outwards outside said slots at said second end surface of said stator core from said second layer in said first slot of said first pair and said third layer in said second slot of said first pair, wherein each of said stator winding phase portions is constructed by connecting said first and second sub-portions in series by crossover connecting said second strand of wire extending outwards outside said slots at said first end surface of said stator core from said third layer in said first slot of a second pair, and said first strand of wire extending outwards from the outside of the slots at said first end surface of said stator core from said first layer in said second slot of said second pair, said second pair being another pair of said slot pairs constituting each of said slot sets, and wherein said first strand of wire extending outwards at said first end surface of said stator core from said second layer in said first slot of said second pair, and said second strand of wire extending outwards at said first end surface of said stator core from said fourth layer in said second slot of said second pair constitute a neutral point and an output wire of said stator winding phase portion, respectively.

7. The alternator according to claim 1 wherein:

four of said strands of wire constituting said winding sub-portions are housed so as to line up in each of said slots so as to occupy a first layer, a second layer, a third layer, and a fourth layer in a slot depth direction;

turn portions formed by folding said strands of wire over outside said slots at a first end surface of said stator core are disposed circumferentially to form two rows in a radial direction; and turn portions formed by folding said strands of wire over outside said slots at a second end surface of said stator core are disposed in one row circumferentially.

8. A winding assembly for an alternator, said winding assembly comprising a winding group composed of 2n winding sub-portions disposed at a pitch of p, each of said winding sub-portions being constructed by folding and bending one strand of wire formed from a continuous wire into a pattern, said pattern having:

first straight portions disposed at a pitch of 2np;

second straight portions disposed at said pitch of 2np being offset by an amount w to a first side in a width direction from said first straight portions and offset by an amount np forwards relative to a direction of disposal of said first straight portions;

third straight portions disposed at said pitch of 2np being offset by said amount w to said first side in said width direction from said second portions and offset by said amount np backwards relative to said direction of disposal of said second straight portions;

fourth straight portions disposed at said pitch of 2np being offset by said amount w to said first side in said width direction from said third straight portions and offset by said amount np forwards relative to said direction of disposal of said third straight portions;

first turn portions linking first ends of said first straight portions to first ends of said second straight portions offset by said amount np forwards relative to said direction of disposal of said first straight portions;

second turn portions linking second ends of said second straight portions to second ends of said third straight portions offset by said amount np backwards relative to said direction of disposal of said second straight portions;

third turn portions linking first ends of said third straight portions to first ends of said fourth straight portions offset by said amount np forwards relative to said direction of disposal of said third straight portions; and fourth turn portions linking second ends of said fourth straight portions to second ends of said first straight portions offset by said amount np forwards relative to said direction of disposal of said fourth straight portions, wherein said winding sub-portions are disposed parallel to each other at said pitch of p in said direction of disposal such that said first to fourth straight portions form four layers in said width direction, said first turn portions are disposed parallel to each other at said pitch of p and said third turn portions are disposed parallel to each other at said pitch of p such that said first turn portions and said third turn portions form two rows in said direction of disposal, and said second turn portions are disposed parallel to each other at said pitch of p and said fourth turn portions are disposed parallel to each other at said pitch of p such that said second turn portions and said fourth turn portions form two layers in a longitudinal direction of said straight portions.

9. A winding assembly for an alternator, said winding assembly comprising a winding group composed of 2n winding sub-portions disposed at a pitch of p, each of said winding sub-portions being constructed by folding and bending one strand of wire formed from a continuous wire into a pattern, said pattern having:

first straight portions disposed at a pitch of 2np;

second straight portions disposed at said pitch of 2np being offset by an amount w to a first side in a width direction from said first straight portions and offset by an amount np forwards relative to a direction of disposal of said first straight portions;

third straight portions disposed at said pitch of 2np being offset by said amount w to said first side in said width direction from said second portions and offset by said amount np forwards, relative to said direction of disposal of said second straight portions;

fourth straight portions disposed at said pitch of 2np being offset by said amount w to said first side in said width direction from said third straight portions and offset by said amount np backwards relative to said direction of disposal of said third straight portions;

first turn portions linking first ends of said first straight portions to first ends of said second straight portions offset by said amount np forwards relative to said direction of disposal of said first straight portions;

second turn portions linking second ends of said second straight portions to second ends of said third straight portions offset by said amount np forwards relative to said direction of disposal of said second straight portions;

third turn portions linking first ends of said third straight portions to first ends of said fourth straight portions offset by said amount np backwards relative to said direction of disposal of said third straight portions; and fourth turn portions linking second ends of said fourth straight portions to second ends of said first straight portions offset by said amount np forwards relative to said direction of disposal of said fourth straight portions, wherein said winding sub-portions are disposed parallel to each other at said pitch of p in said direction of disposal such that said first to fourth straight portions form four layers in said width direction, said first turn portions are disposed parallel to each other at said pitch of p and said third turn portions are disposed parallel to each other at said pitch of p such that said first turn portions and said third turn portions form two rows in said direction of disposal, and said second turn portions are disposed parallel to each other at said pitch of p and said fourth turn portions are disposed parallel to each other at said pitch of p such that said second turn portions and said fourth turn portions form two layers in a longitudinal direction of said straight portions.

* * * * *